US008706788B2

(12) United States Patent
Shin et al.

(10) Patent No.: US 8,706,788 B2
(45) Date of Patent: Apr. 22, 2014

(54) MODULAR CALCULATOR, OPERATION METHOD OF THE MODULAR CALCULATOR, AND APPARATUSES HAVING THE SAME

(75) Inventors: Jong Hoon Shin, Hwaseong-si (KR); Kyoung Moon Ahn, Seoul (KR); Young Sik Kim, Hwaseong-si (KR); Sun-Soo Shin, Seoul (KR); Ji-Su Kang, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 424 days.

(21) Appl. No.: 13/241,778

(22) Filed: Sep. 23, 2011

(65) Prior Publication Data

US 2012/0096062 A1   Apr. 19, 2012

(30) Foreign Application Priority Data

Oct. 14, 2010   (KR) .......................... 10-2010-0100200

(51) Int. Cl.
*G06F 7/72*   (2006.01)
(52) U.S. Cl.
USPC .......................................................... 708/491
(58) Field of Classification Search
CPC ...................................................... G06F 7/727
See application file for complete search history.

(56) References Cited

U.S. PATENT DOCUMENTS

| 5,261,001 | A | 11/1993 | Dariel et al. |
| 6,263,081 | B1 | 7/2001 | Miyaji et al. |
| 7,194,088 | B2* | 3/2007 | Langston et al. ............... 380/28 |
| 8,233,615 | B2* | 7/2012 | Douguet et al. ................ 380/28 |
| 8,364,737 | B2* | 1/2013 | Fischer ......................... 708/490 |
| 2007/0100925 | A1* | 5/2007 | Fischer ......................... 708/620 |
| 2009/0180609 | A1* | 7/2009 | Douguet et al. ............... 380/28 |
| 2010/0146028 | A1* | 6/2010 | Lambert ....................... 708/491 |
| 2012/0096062 | A1* | 4/2012 | Shin et al. .................... 708/491 |
| 2012/0197956 | A1* | 8/2012 | Fischer ......................... 708/530 |

FOREIGN PATENT DOCUMENTS

| JP | 2010-044398 | 2/2010 |
| KR | 1020050089067 | 9/2005 |

* cited by examiner

*Primary Examiner* — David H Malzahn
(74) *Attorney, Agent, or Firm* — Stanzione & Kim, LLP

(57) ABSTRACT

A modular calculator and a method of performing a modular calculation are provided. The modular calculator includes a first register to receive and to store a first integer, a second register to receive and to store a second integer, a calculator connected to an output terminal of the first register and an output terminal of the second register, and a controller to determine an arithmetic operation of the calculator by referring to a sign of the first integer and a sign of the second integer and to control the calculator to perform the determined arithmetic operation on one of an addition and a subtraction of the first integer and the second integer and a modulus value.

20 Claims, 14 Drawing Sheets

MODULAR CALCULATOR, OPERATION METHOD OF THE MODULAR CALCULATOR, AND APPARATUSES HAVING THE SAME

CROSS-REFERENCE TO RELATED APPLICATIONS

This application claims the benefit of priority under 35 U.S.C. §119(a) to Korean Patent Application No. 10-2010-0100200 filed on Oct. 14, 2010, in the Korean Intellectual Property Office, the disclosure of which is hereby incorporated by reference in its entirety.

BACKGROUND OF THE INVENTION

1. Field of the Invention

Embodiments of the present general inventive concept relate to a modular calculator, and more particularly, when a modular addition or a modular subtraction is performed, to a method of performing an arithmetic operation, by using each sign information of two integers necessary for the modular addition or subtraction, on one of addition and subtraction of the two integers and a modulus value, and devices to perform the method.

2. Description of the Related Art

A modulus reduction method performed in a modulus operation multiplies two integers and calculates the remainder after dividing a multiplication result by a modulus. However, division requires much calculation, so that a general modular reduction method is not used in a cryptographic operation using great integer values.

In a cryptographic operation instead of a general modular reduction method, a Montgomery multiplication method is widely used.

In case of a general modular reduction method, a trial division, a process of dividing for calculating a quotient in division, is required. However, it is possible to calculate a quotient of a reduction operation only using an acknowledged value in case of Montgomery multiplication using a Montgomery algorithm, so that it is easy to be embodied.

In particular, a Montgomery multiplication is possible to be embodied at a low cost since it may replace a general division with a division of involution of 2 which is easily embodied in a right-shifter.

Similarly, a general method may be considered in a modular reduction method in a modular addition or a modular subtraction. That is, the remainder is calculated by adding two integers and dividing a result by a modulus. However, in this case, a median calculated by adding two integers does not deviate from a modulus value greatly, unlike a modulus multiplication in which the multiplication of the two integers may greatly deviate from the modulus value. As such, a modular reduction is possible not through division but through subtraction. That is, after calculating a median, a modulus is subtracted only in case the median is more than a modulus value, and the median is output as it is in the other cases. A modulus subtraction is performed in the same way. When there is a negative number after comparing a median calculated by subtracting two integers with 0, a modulus is added. Otherwise, a median is output as it is.

SUMMARY OF THE INVENTION

The present general inventive concept provides an apparatus and method to, when a modular addition or a modular subtraction is performed, determine an arithmetic operation method to perform on one of addition and subtraction of two integers and a modulus value, by using each sign information of two integers necessary for the modular addition or the modular subtraction such that a result can be calculated without comparing the result of the addition or subtraction of the two integers with the modulus value and without performing a division operation.

Additional aspects and advantages of the present general inventive concept will be set forth in part in the description which follows and, in part, will be obvious from the description, or may be learned by practice of the general inventive concept.

The foregoing and/or other features and utilities of the present general inventive concept may be realized by a modular calculator including a first register to receive and to store a first integer, a second register to receive and to store a second integer, a calculator connected to an output terminal of the first register and an output terminal of the second register, and a controller to determine an arithmetic operation of the calculator by referring to a sign of the first integer and a sign of the second integer and to control the calculator to perform the determined arithmetic operation on one of an addition and a subtraction of the first integer and the second integer and a modulus value.

The modular calculator may further include a third register to store the modulus value and to output it to the calculator.

The calculator may perform the arithmetic operation on the addition based on the sign of the first integer and the sign of the second integer according to an equation 1.

$$A<0 \text{ and } B<0, C=A+B+M$$

$$A<0 \text{ and } B\geq0, C=A+B$$

$$A\geq0 \text{ and } B<0, C=A+B$$

$$A\geq0 \text{ and } B\geq0, C=A+B-M \qquad \text{[Equation 1]}$$

Here, A is the first integer, B is the second integer, M is the modulus value, and C is a result value.

When a result value calculated by performing the arithmetic operation is less than 0, the calculator may calculate a new result value by adding the modulus value to the result value and may output the new result value.

The calculator may perform the arithmetic operation on the subtraction based on the sign of the first integer and the sign of the second integer according to an equation 2.

$$\text{when } A<0 \text{ and } B<0, C=A-B$$

$$\text{when } A<0 \text{ and } B\geq0, C=A-B+M$$

$$\text{when } A\geq0 \text{ and } B<0, C=A-B-M$$

$$A\geq0 \text{ and } B\geq0, C=A-B \qquad \text{[Equation 2]}$$

Here, A is the first integer, B is the second integer, M is the modulus value, and C is a result value.

When a result value calculated by performing the arithmetic operation is less than 0, the calculator may calculate a new result value by adding the modulus value to the result value and may output the new result value.

The modulus calculator may be included in a part of a memory controller of a non-volatile memory.

The foregoing and/or other features and utilities of the present general inventive concept may be also realized by a modular calculation method, including receiving a first integer and a second integer and determining each sign of the first integer and the second integer, performing an addition or a subtraction of the first and second integers by a calculator, determining an arithmetic operation of a calculator by referring to the determined signs of each of the first and second integers, and performing the determined arithmetic operation, by the calculator, on one of the addition and the subtraction of the first integer and the second integer and a modulus value.

The performing the arithmetic operation may include performing the arithmetic operation on the addition based on each sign of the first integer and the second integer according to an equation 3.

$A<0$ and $B<0$, $C=A+B+M$ $A<0$ and $B\geq 0$, $C=A+B$ $A\geq 0$ and $B<0$, $C=A+B$ $A\geq 0$ and $B\geq 0$, $C=A+B-M$ [Equation 3]

Here, A is the first integer, B is the second integer, M is the modulus value, and C is a result value.

When a result value calculated by performing the arithmetic operation is less than 0, the performing the arithmetic operation may further include calculating a new result value by adding the modulus value to the result value and outputting the new result value.

The performing the arithmetic operation may include performing the arithmetic operation on the subtraction based on the sign of the first integer and the sign of the second integer according to an equation 4.

$A<0$ and $B<0$, $C=A-B$ $A<0$ and $B\geq 0$, $C=A-B+M$ $A\geq 0$ and $B<0$, $C=A-B-M$ $A\geq 0$ and $B\geq 0$, $C=A-B$ [Equation 4]

Here, A is the first integer, B is the second integer, M is the modulus value, and C is a result value.

When a result value calculated by performing the arithmetic operation is less than 0, the performing the arithmetic operation may further include calculating a new result value by adding the modulus value to the result value and outputting the new result value.

The foregoing and/or other features and utilities of the present general inventive concept may be also realized by a memory device including a non-volatile memory to storing a first integer and a second integer, and a memory controller including the modular calculator to perform a modular operation on addition or subtraction of the first integer and the second integer.

The modular calculator includes a first register to receive and to store the first integer, a second register to receive and to store the second integer, a calculator connected to an output terminal of the first register and an output terminal of the second register, a controller to determine an arithmetic operation of the calculator by referring to a sign of the first integer and a sign of the second integer and to control the calculator to perform the determined arithmetic operation on one of the addition or the subtraction of the first integer and the second integer and a modulus value.

The foregoing and/or other features and utilities of the present general inventive concept may also be realized by an electronic device including a memory device and a processor to control an operation of the memory device. The memory device includes a non-volatile memory to store a first integer and a second integer, and a memory controller including a modular calculator to perform a modular operation on an addition or a subtraction of the first integer and the second integer. The modular calculator includes a first register to receive and to store the first integer, a second register to receive and to store the second integer, a calculator connected to an output terminal of the first register and an output terminal of the second register, a controller to determine an arithmetic operation of the calculator by referring to a sign of the first integer and a sign of the second integer and to control the calculator to perform the determined arithmetic operation on one of the addition or the subtraction of the first integer and the second integer and a modulus value.

The foregoing and/or other features and utilities of the present general inventive concept may also be realized by a memory card including a card interface, a non-volatile memory to store a first integer and a second integer, and a memory controller to control a data exchange between the card interface and the non-volatile memory and including a modular calculator to perform a modular operation on an addition or a subtraction of the first integer and the second integer. The modular calculator includes a first register to receive and to store the first integer, a second register to receive and to store the second integer, a calculator connected to an output terminal of the first register and an output terminal of the second register, a controller to determine an arithmetic operation of the calculator by referring to a sign of the first integer and a sign of the second integer and to control the calculator to perform the determined arithmetic operation on one of the addition or the subtraction of the first integer and the second integer and a modulus value.

The foregoing and/or other features and utilities of the present general inventive concept may also be realized by a modular calculator including a first register to store a first integer, a second register to store a second integer and a modulus value, wherein the first integer and the second integer are greater than or equal to a negative of the modulus value and less than the modulus value, a calculator to calculate a median by performing an addition or a subtraction operation on the first integer and the second integer and to calculate and output a result value, and a controller to control the calculator to perform either the addition or the subtraction operation and to control the calculator to calculate the result value by performing one of adding the modulus value to the calculated median, subtracting the modulus value from the calculated median, and not modifying the calculated median according to a first sign information of the first integer and a second sign information of the second integer.

The first register may output the first sign information of the first integer to the controller and the second register may output the second sign information of the second integer to the controller.

The modular calculator may include a first multiplexer to receive the first integer from an external source and the calculated median from the calculator, and a second multiplexer to receive the second integer and the modulus value from the external source, wherein the controller outputs a first selection signal to the first multiplexer to control the first multiplexer to output either the first integer or the median value to the first register and outputs a second selection signal to the second multiplexer to control the second multiplexer to output either the second integer or the modulus value to the second register.

The controller may output a first control signal to the calculator to control the calculator to perform either the addition or the subtraction operation on the first integer and the second integer and may output a second control signal to the calculator to control the calculator to perform one of adding the modulus value to the calculated median, subtracting the modulus value from the calculated median, and not modifying the calculated median.

When the controller controls the calculator to perform the addition operation, the controller may control the calculator to calculate the result value according to an equation 5, $$A<0 \text{ and } B<0, C2=C1+M$$
$$A<0 \text{ and } B\geq0, C2=C1$$
$$A\geq0 \text{ and } B<0, C2=C1$$
$$A\geq0 \text{ and } B\geq0, C2=C1-M \quad \text{[Equation 5]}$$

Here, A is the first integer, B is the second integer, M is the modulus value, C1 is the calculated median, and C2 is the result value, and when the controller controls the calculator to perform the subtraction operation, the controller controls the calculator to calculate the result value according to an equation 6, $$A<0 \text{ and } B<0, C2=C1$$
$$A<0 \text{ and } B\geq0, C2=C1+M$$
$$A\geq0 \text{ and } B<0, C2=C1-M$$
$$A\geq0 \text{ and } B\geq0, C2=C1 \quad \text{[Equation 6]}$$

Here, A is the first integer, B is the second integer, M is the modulus value, C1 is the calculated median, and C2 is the result value.

BRIEF DESCRIPTION OF DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
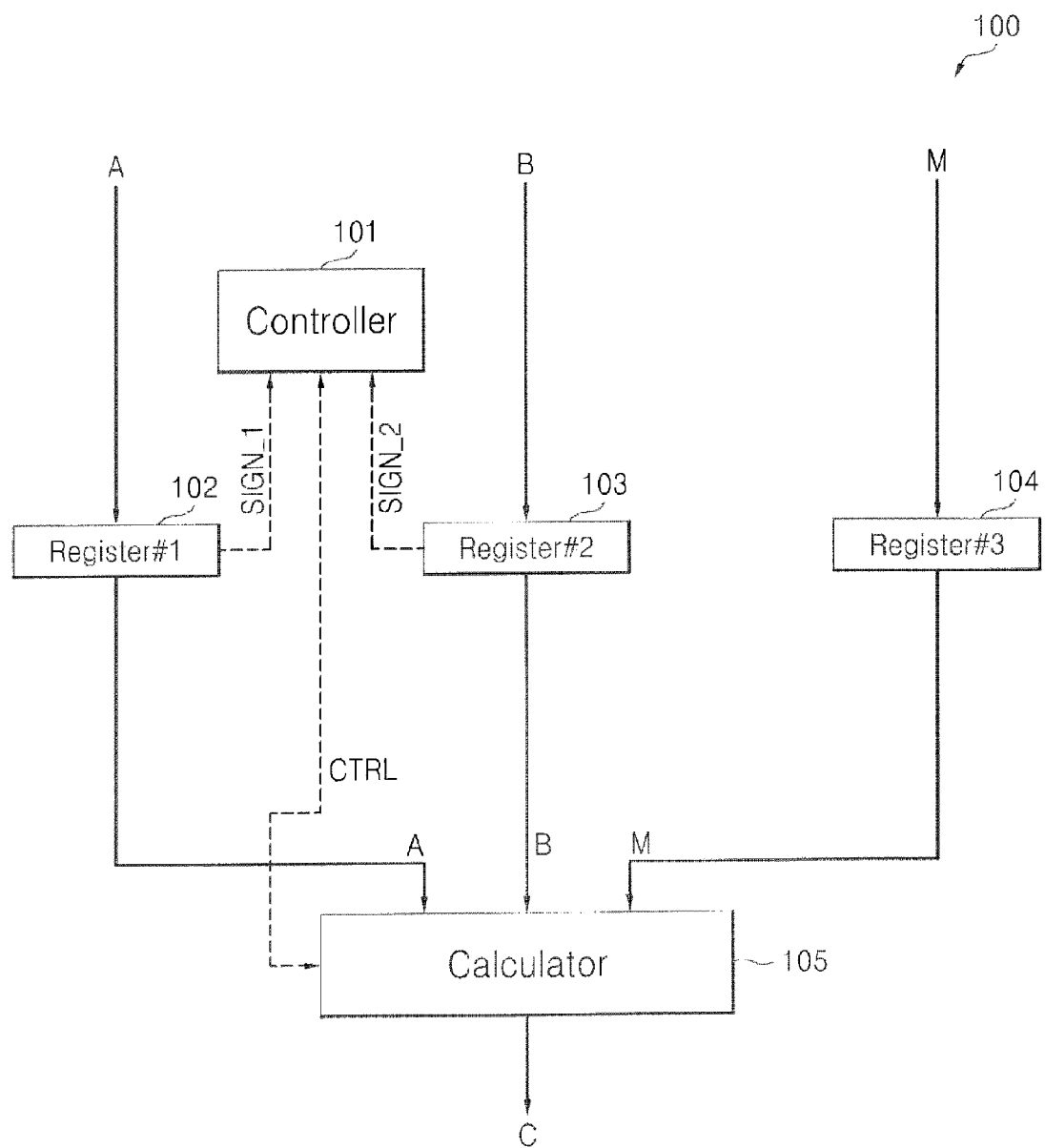
FIG. 1 is a block diagram of a modular calculator according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of a modular calculator according to an exemplary embodiment of the present general inventive concept. Referring to FIG. 1, the modular calculator 100 includes a controller 101, a first register 102, a second register 103, a third register 104 and a calculator 105. The calculator 105 illustrated in FIG. 1 is a three-input calculator which may receive three inputs, i.e., values output from each of the first register 102, the second register 103 and the third register 104.

A modular operation on an addition (A+B) or subtraction (A−B) of two integers A and B with a modulus M performed by the modular calculator 100, i.e., an operation of (A±B) mod M, is as follows.

A first integer A is stored in the first register 102, a second integer B is stored in the second register 103, and a modulus M is stored in the third register 104. The modulus M is a natural number, i.e. a positive integer. The first integer A, the second integer B and the modulus M may be stored as multibit binary data. The first register 102 outputs sign information SIGN_1 of the first integer A to the controller 101, indicating whether the sign of the first integer A is positive or negative. The second register 103 outputs sign information SIGN_2 of the second integer B to the controller 101, indicating whether the sign of the second integer B is positive or negative.

The controller 101 receives the sign information SIGN_1 and SIGN_2 of each of the first integer A and the second integer B stored in each of the first register 102 and the second register 103.

The controller 101 determines whether each sign of the first integer A and the second integer B is positive or negative by referring to the sign information SIGN_1 and SIGN_2. The controller 101 determines an arithmetic operation of the calculator 105 to perform on (A±B) and the modulus M according to the sign information SIGN_1 and SIGN_2 of the first integer A and the second integer B.

Once an operation of the calculator 105 to perform on (A±B) and the modulus M is determined, the controller 101 generates a control signal CTRL based on the determination and transmits the control signal CTRL to the calculator 105.

According to an exemplary embodiment, the controller 101 may determine whether the calculator 105 performs an arithmetic operation on (A±B) and the modulus M. When it is determined not to perform the arithmetic operation, the calculator 105 may output only one of an addition (A+B) and a subtraction (A−B) of the first integer A and the second integer B, i.e., (A±B), according to the control signal CTRL output from the controller 101.

The calculator 105 receives the modulus M output from the third register 104 as well as the first integer A and the second integer B output from the first register 102 and the second register 103. The calculator 105 may perform an arithmetic operation on (A±B) and the modulus M according to the control signal CTRL output from the controller 101. The calculator 105 calculates (A±B) mod M and outputs a calculation result C.

When there are three registers 102, 103 and 104, a modulus M for a modulus operation may be stored in the third register 104.

The modulus calculator 100 of the present general inventive concept may determine whether to add or subtract a modulus M to/from (A±B) or to not modify (A±B) according to the sign of each of the first integer A and the second integer B without calculating (A±B) first when calculating (A±B) mod M. Accordingly, the calculator 105 of the modular calculator 100 may perform an arithmetic operation on (A±B) and a modulus M without calculating (A±B) first.

In a modular operation method of the modular calculator 100 illustrated in FIG. 1, the controller 101 may determine a modular operation on (A±B), i.e., an arithmetic operation method of (A±B) and a modulus M, according to a sign of each of the first integer A and the second integer B stored in each of the first register 102 and the second register 103.

Each of the first integer A and the second integer B may be greater than or equal to a negative modulus (−M) and less than a positive modulus M. Therefore, a range of the first integer A and the second integer B is determined as follows.

$$-M \leq A < 0, -M \leq B < 0 \quad \quad 1)$$

$$-M \leq A < 0, 0 \leq B < M \quad \quad 2)$$

$$0 \leq A < M, -M \leq B < 0 \quad \quad 3)$$

$$0 \leq A < M, 0 \leq B < M \quad \quad 4)$$

The calculator 105 performs a modulus operation on an addition (A+B) of the first integer A and the second integer B, i.e., an arithmetic operation on (A+B) and a modulus M, as follows and outputs a result value C.

$$A<0, B<0 \rightarrow C=A+B+M(-M \leq C < M) \quad \quad 5)$$

$$A<0, B \geq 0 \rightarrow C=A+B(-M \leq C < M) \quad \quad 6)$$

$$A \geq 0, B<0 \rightarrow C=A+B(-M \leq C < M) \quad \quad 7)$$

$$A \geq 0, B \geq 0 \rightarrow C=A+B-M(-M \leq C < M) \quad \quad 8)$$

When the calculator 105 performs a modulus operation on subtraction (A−B) of the first integer A and the second integer B, a range of the first integer A and the second integer B is determined as follows. Each of the first integer A and the second integer B is assumed to be greater than or equal to a negative modulus −M and less than a positive modulus M.

$$-M \leq A < 0, -M \leq B < 0 \quad \quad 1)$$

$$-M \leq A < 0, 0 \leq B < M \quad \quad 2)$$

$$0 \leq A < M, -M \leq B < 0 \quad \quad 3)$$

$$0 \leq A < M, 0 \leq B < M \quad \quad 4)$$

The calculator 105 performs a modulus operation on a subtraction (A−B) of the first integer A and the second integer B, i.e., an arithmetic operation on (A−B) and a modulus M, as follows and outputs a result value C.

$$A<0, B<0 \rightarrow C=A-B(-M<C<M) \quad \quad 5)$$

$$A<0, B \geq 0 \rightarrow C=A-B+M(-M<C<M) \quad \quad 6)$$

$$A \geq 0, B<0 \rightarrow C=A-B-M(-M<C<M) \quad \quad 7)$$

$$A \geq 0, B \geq 0 \rightarrow C=A-B(-M<C<M) \quad \quad 8)$$

According to an exemplary embodiment, a result value C output from the calculator 105 may be stored in one of the first register 102, the second register 103 and the third register 104. According to an exemplary embodiment, the modular calculator 100 may transmit a result value C to an external memory or a host (not shown).

Moreover, the controller 101 may control the calculator 105 to output a new result value by adding a modulus M to a result value C when a result value C output from the calculator 105 is less than 0.

Figure 2:
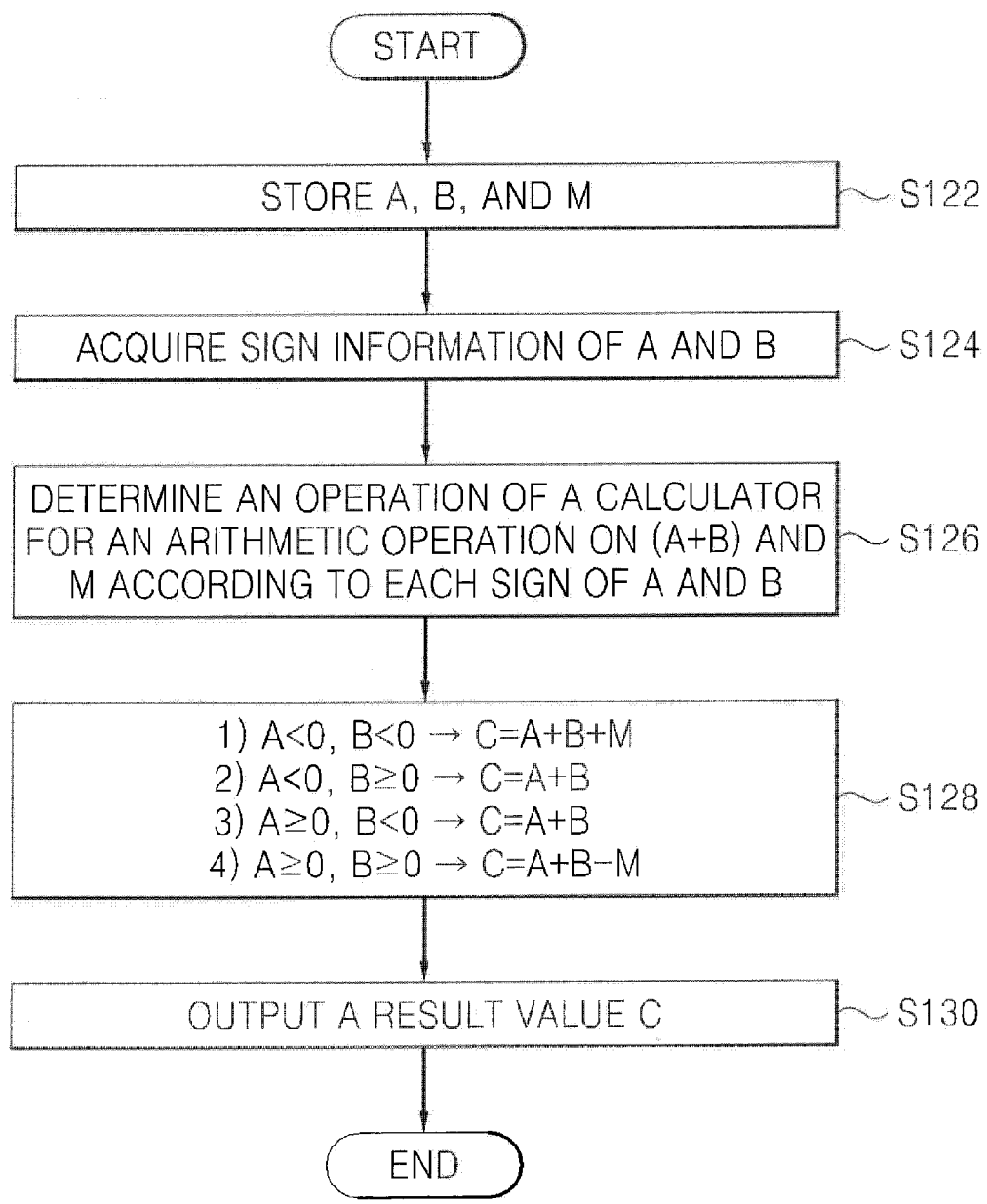
FIG. 2 is a flowchart illustrating an exemplary embodiment of a modular operation method of the modular calculator illustrated in FIG. 1.

FIG. 2 is a flowchart illustrating an example of a modulus operation method of the modular calculator illustrated in FIG. 1. FIG. 2 shows a modular operation method on a modular addition, i.e., (A+B).

Referring to FIGS. 1 and 2, the modular calculator 100 stores each received integer A, B and M in each register 102, 103 and 104 in operation S122. The controller 101 acquires sign information SIGN_1 and SIGN_2 of each of a first integer A, output from the first register 102, and a second integer B, output from the second register 103 in operation S124. The controller 101 judges or determines a sign of the first integer A and a sign of the second integer B referring to received sign information SIGN_1 and SIGN_2.

Sign information SIGN_1 is information indicating whether a sign of the first integer A is positive or negative and SIGN_2 is information indicating whether a sign of the second integer B is positive or negative. According to an exemplary embodiment, the controller 101 may receive the first integer A and the second integer B from each of the first register 102 and the second register 103 and determine a sign of each of received integers A and B based on the sign information SIGN_1 and SIGN_2.

When each of the first integer A and the second integer B is multi-bit binary data, the sign information SIGN_1 and SIGN_1 may be a most significant bit (MSB) of the multi-bit binary data of the first integer A and the second integer B.

Each of the first integer A and the second integer B is greater than or equal to a negative modulus −M and less than a positive modulus M, so that a sign of the first integer A and the second integer B may be determined as follows.

$$-M \leq A < 0, -M \leq B < 0 \quad \quad 1)$$

$$-M \leq A < 0, 0 \leq B < M \quad \quad 2)$$

$$0 \leq A < M, -M \leq B < 0 \quad \quad 3)$$

$$0 \leq A < M, 0 \leq B < M \quad \quad 4)$$

The controller 101 may determine an operation of the calculator 105, which performs an arithmetic operation on addition of the first integer A and the second integer B, i.e., (A+B), and a modulus M, according to each sign or sign bit of the first integer A and the second integer B in operation S126. The controller 101 may transmit a control signal CTRL to the calculator 105 so that the calculator 105 may perform an operation determined in operation S126.

The calculator 105 may perform an arithmetic operation on an addition of the first integer A and the second integer B, i.e., (A+B), and a modulus M in operation S128 according to a control signal CTRL output from the controller 101. A result value C is calculated according to an arithmetic operation performed by the calculator 105 as follows.

$$A<0, B<0 \rightarrow C=A+B+M(-M \leq C<M) \quad 5)$$

$$A<0, B \geq 0 \rightarrow C=A+B(-M \leq C<M) \quad 6)$$

$$A \geq 0, B<0 \rightarrow C=A+B(-M \leq C<M) \quad 7)$$

$$A \geq 0, B \geq 0 \rightarrow C=A+B-M(-M \leq C<M) \quad 8)$$

The calculator 105 outputs a result value C in operation S130. Here, the controller 101 may control an output path of the calculator 105 so that a result value C may be stored in the first register 102, the second register 103 or the third register 104. For example, when the first integer A is −11, the second integer B is −13 and the modulus M is 17, a result value C, i.e., (A+B)+M, becomes (−11−13+17=−7), since the first integer A and the second integer B are both less than 0. Accordingly, the calculator 105 may output (−7) as a result value C.

When the first integer A is −11, the second integer B is 13 and the modulus M is 17, a result value C, i.e., (A+B), becomes (−11+13=2), since the first integer A is less than 0 and the second integer B is greater than 0. Accordingly, the calculator 105 may output 2 as a result value C.

When the first integer A is 11, the second integer B is −13 and the modulus M is 17, the result value C, i.e., (A+B), becomes (11−13=−2), since the first integer A is greater than 0 and the second integer B is less than 0. Accordingly, the calculator 105 may output (−2) as a result value C.

When the first integer A is 11, the second integer B is 13 and the modulus M is 17, a result value C, (A+B)−M, becomes (11+13−17=7), since the first integer A and the second integer B are both greater than 0. Accordingly, the calculator 105 may output 7 as a result value C.

In addition, the controller 101 may control an operation of the calculator 105 according to an exemplary embodiment so that a new result value C calculated by adding a modulus M to a result value C when the result value C is less than 0. For example, the controller 101 may control an operation of the calculator 105 to output 10 or 15 as a result value C by adding once more a modulus M, i.e., 17, to (−7) or (−2) output as a result value C.

Figure 3:
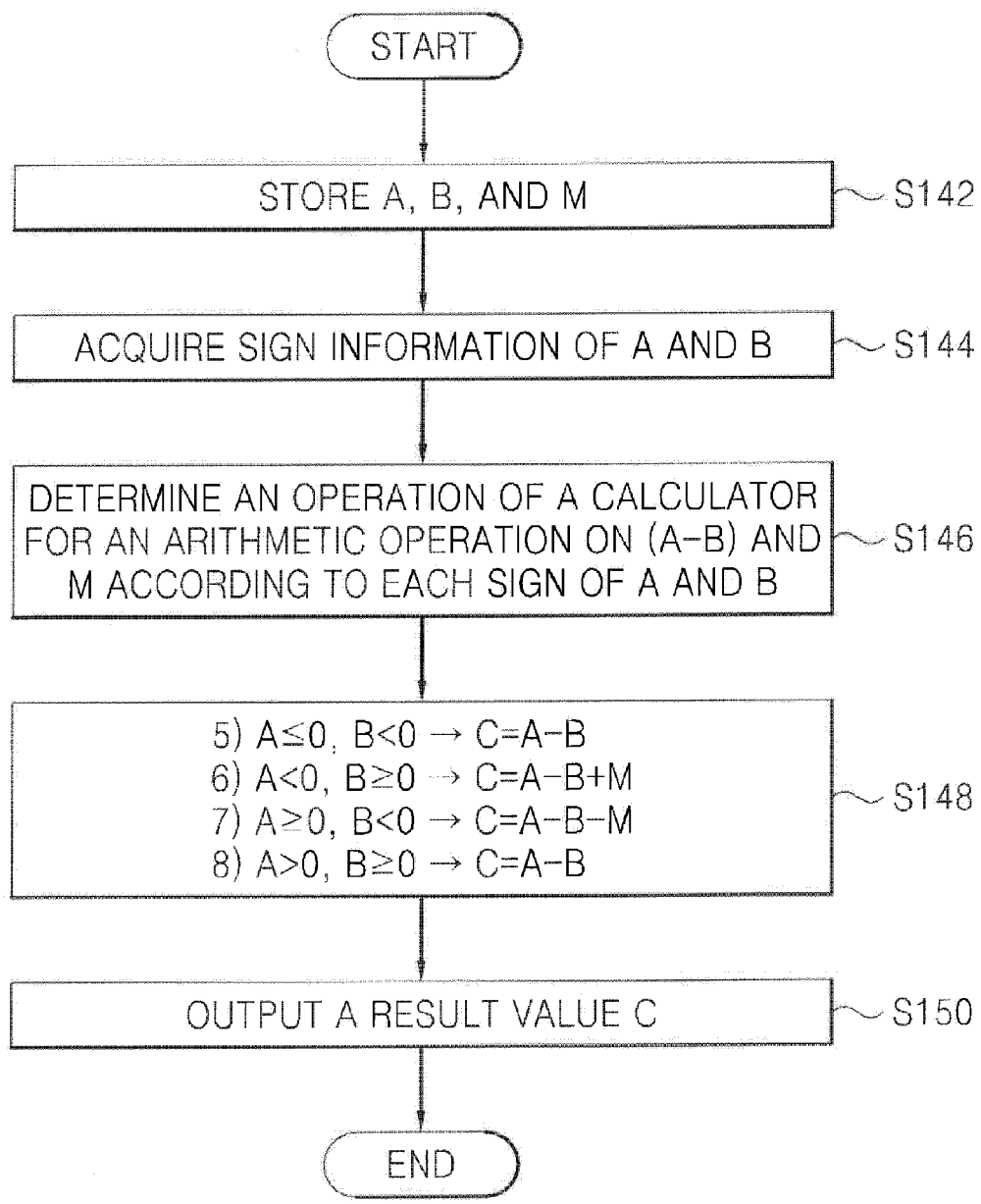
FIG. 3 is a flowchart illustrating another exemplary embodiment of a modular operation method of the modular calculator illustrated in FIG. 1.

FIG. 3 is a flowchart illustrating another example of a modular operation method of the modular operator illustrated in FIG. 1. FIG. 3 shows a modular operation method on a modular subtraction, i.e., (A−B), among modular operation methods.

Referring to FIGS. 1 and 3, the modular calculator 100 receives and stores each input integer A, B and modulus M in each register 102, 103 and 104 in operation S142. The controller 101 acquires or obtains sign information SIGN_1 and SIGN_2 on each of the first integer A and the second integer B stored in each of the first register 102 and the second register 103 in operation S144. The controller 101 determines each sign of the first integer A and the second integer B by referring to acquired or obtained sign information SIGN_1 and SIGN_2.

According to an exemplary embodiment, the controller 101 may receive the first integer A and the second integer B output from each of the first register 102 and the second register 103 and determine each sign of received integers A and B by referring to each of the received integers A and B.

As explained in FIG. 2, each of the first integer A and the second integer B is greater than or equal to a negative modulus −M and less than a positive modulus M, so that each sign of the first integer A and the second integer B may be determined as follows.

$$-M \leq A<0, -M \leq B<0 \quad 1)$$

$$-M \leq A<0, 0 \leq B<M \quad 2)$$

$$0 \leq A<M, -M \leq B<0 \quad 3)$$

$$0 \leq A<M, 0 \leq B<M \quad 4)$$

The controller 101 may determine an operation of the calculator 105 which performs an arithmetic operation on subtraction of the first integer A and the second integer B, i.e., (A−B), and a modulus M, according to a sign of each of the first integer A and the second integer B in operation S146. The controller 101 may transmit a control signal CTRL to the calculator 105 so that the calculator 105 may perform an operation determined in operation S146.

The calculator 105 may perform an arithmetic operation on a subtraction of the first integer A and the second integer B, i.e., (A−B), and the modulus M in operation S148 according to a control signal CTRL output from the controller 101. A result value C is calculated according to an arithmetic operation performed by the calculator 105 as follows.

$$A<0, B<0 \rightarrow C=A-B(-M<C<M) \quad 5)$$

$$A<0, B \geq 0 \rightarrow C=A-B+M(-M<C<M) \quad 6)$$

$$A \geq 0, B<0 \rightarrow C=A-B-M(-M<C<M) \quad 7)$$

$$A \geq 0, B \geq 0 \rightarrow C=A-B(-M<C<M) \quad 8)$$

The calculator 105 outputs a result value C in operation S150. Here, the controller 101 may control an output path of the calculator 105 so that a result value C may be stored in a first register 102, a second register 103 or a third register 104.

For example, when the first integer A is −11, the second integer B is −13 and the modulus M is 17, a result value C, i.e., (A−B), becomes (−11−(−13)=2), since the first integer A and the second integer B are both less than 0. Accordingly, the calculator 105 may output 2 as a result value C.

When the first integer A is −11, the second integer value B is 13 and the modulus M is 17, a result value C, i.e., (A−B+M), becomes (−11−13+17=−7), since the first integer A is less than 0 and the second integer B is greater than 0. Accordingly, the calculator 105 may output (−7) as a result value C.

When the first integer A is 11 and the second integer B is −13 and the modulus M is 17, a result value C, i.e., (A−B−M), becomes (11−(−13)−17=7), since the first integer A is greater than 0 and the second integer B is less than 0. Accordingly, the calculator 105 may output 7 as a result value C.

When the first integer A is 11 and the second integer B is 13 and the modulus M is 17, a result value C, i.e., (A−B), becomes (11−13=−2), since the first integer A and the second integer B are both greater than 0. Accordingly, the calculator 105 may output (−2) as a result value C.

Moreover, the controller 101 may control an operation of the calculator 105 according to an exemplary embodiment so that a new result value C calculated by adding a modulus M to a result value C when a result value C is less than 0 is output. For example, the controller 101 may control an operation of the calculator 105 to output 10 or 15 as a new result value by adding once more a modulus M, i.e., 17, to output (−7) or (−2) a result value C.

Figure 4:
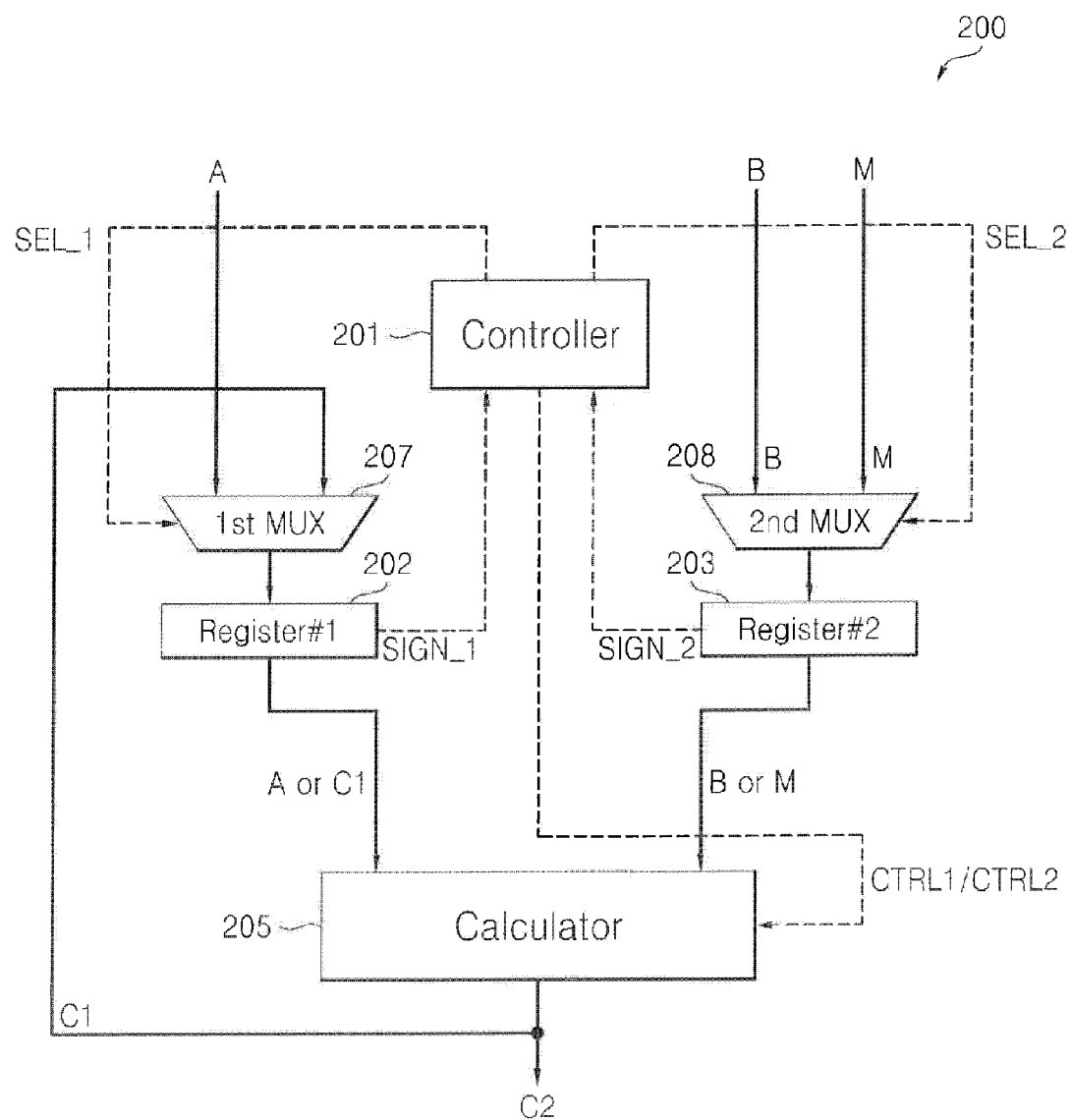
FIG. 4 is a block diagram illustrating a modular calculator according to another exemplary embodiment of the present general concept.

FIG. 4 is a block diagram illustrating a modular operator according to an exemplary embodiment of the present general inventive concept.

Referring to FIG. 4, a modular calculator 200 includes a controller 201, a first multiplexer 207, a second multiplexer 208, a first register 202, a second register 203 and a calculator 205. The calculator 205 of FIG. 4 is a two-input calculator which may receive two inputs, i.e., integers output from the first register 202 and the second register 203.

An operation, which calculates (A±B) mod M by using the modular calculator 200 of FIG. 4, is as follows.

The first integer A is stored in the first register 202 and the second integer B is stored in the second register 203. The first integer A input from outside is stored in the first register 202 through a first multiplexer 207 and the second integer B input from the outside is stored in the second register 203 through a second multiplexer 208.

Here, the controller 201 may transmit a first selection signal SEL_1 having a first level, e.g., a low level, to the first multiplexer 207 to control the first multiplexer 207 to transmit the first integer A to the first register 202. The controller 201 may also transmit a second selection signal SEL_2 having a first level, e.g., a low level, to the second multiplexer 208 to control the second multiplexer 208 to transmit the second integer B to the second register 203.

The first register 202 outputs sign information SIGN_1 to the controller 1 indicating whether the first integer A has a positive or negative value. The second register 203 outputs sign information SIGN_2 indicating whether the second integer B has a positive or negative value. According to an exemplary embodiment, the sign information SIGN_1 and SIGN_2 may be a MSB of the first integer A and the second integer B, respectively. The sign information SIGN_1 and SIGN_2 may also be the first integer A and the second integer B themselves.

The calculator 205 receives the first integer A stored in the first register 202 and the second integer B stored in the second register 203 and performs an arithmetic operation on them.

The calculator 205 may calculate a median C1 of the first integer A and the second integer B by performing an addition or a subtraction of the first integer A and the second integer B according to a control signal CTRL1 output from the controller 201. The calculator 205 calculates the median C1 and outputs the median C1.

When a median C1 is calculated, the calculator 205 transmits the median C1 to the first multiplexer 207. In addition, the second multiplexer 208 receives a modulus M for a modular operation on the median C1. Here, the controller 201 transmits a first selection signal SEL_1 having a second level, e.g., a high level, to the first multiplexer 207 to control the first multiplexer 207 to transmit the median C1 to the first register 202. The controller 201 also transmits a second selection signal SEL_2 having a second level, e.g., a high level, to the second multiplexer 208 to control the second multiplexer 208 to transmit the modulus M to the second register 203.

The controller 201 determines an operation of the calculator 205 to perform on the median C1 and a modulus M according to a sign of each of the first integer A and the second integer B. Once an operation of the calculator 205 is determined, the controller 201 generates a control signal CTRL2 to control the calculator 205 to perform the determined operation and transmits it to the calculator 205. The determined operation may include one of adding the modulus M to the median C1, subtracting the modulus M from the median C1, and not modifying the median C1.

The calculator 205 performs the determined operation on the median C1 output from the first register 202 and the modulus M output from the second register 203 according to a control signal CTRL2 output from the controller 201. The calculator 205 performs the determined operation on the median C1 and the modulus M and outputs a result value C2.

Figure 5:
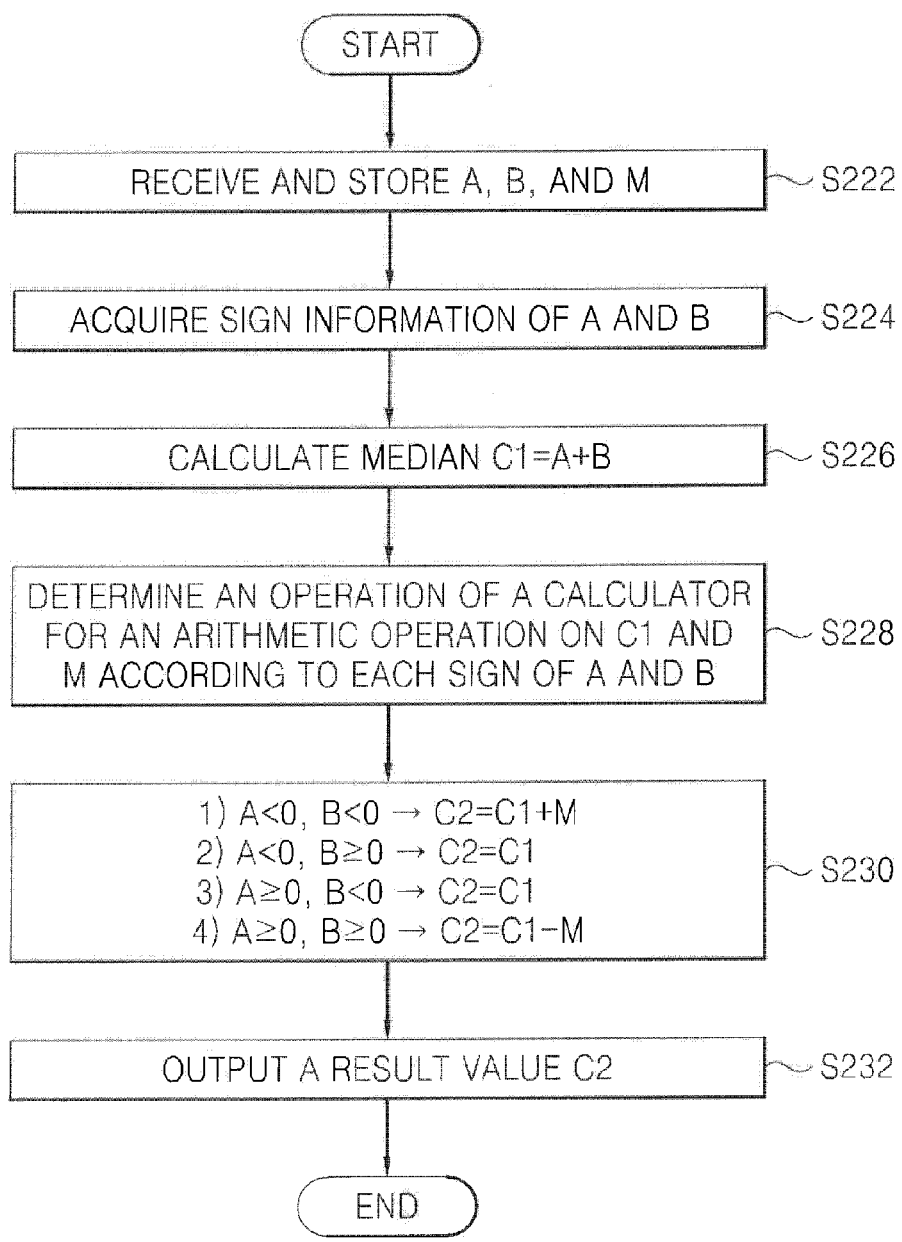
FIG. 5 is a flowchart illustrating an exemplary embodiment of a modular operation method of the modular calculator illustrated in FIG. 4.

FIG. 5 is a flowchart illustrating an example of a modular operation method of the modular calculator 200 illustrated in FIG. 4. FIG. 5 shows a modular operation method on a modular addition, i.e., (A+B), among modular operation methods.

Referring to FIGS. 4 and 5, the modular calculator 200 stores each integer A and B, which are input from outside, in each register 202 or 203 in operation S222. The controller 201 acquires or obtains sign information SIGN_1 and SIGN_2 of each of the first integer A and the second integer B in operation S224. The controller 201 determines each sign of the first integer A and the second integer B referring to acquired or obtained sign information SIGN_1 and SIGN_2. Each of the first integer A and the second integer B is greater than or equal to a negative modulus −M and less than a positive modulus M, so that a sign of the first integer A and the second integer B may be determined as follows.

$$-M \le A < 0, -M \le B < 0 \quad \quad \quad \quad 1)$$

$$-M \le A < 0, 0 \le B < M \quad \quad \quad \quad 2)$$

$$0 \le A < M, -M \le B < 0 \quad \quad \quad \quad 3)$$

$$0 \le A < M, 0 \le B < M \quad \quad \quad \quad 4)$$

Moreover, the controller 201 generates a control signal CTRL1 to control an operation of the calculator 205 and transmits it to the calculator 205 to calculate an addition of the first integer A and the second integer B, i.e., a median (C1=A+B). The calculator 205 calculates an addition of the first integer A and the second integer B, i.e., a median (C1=A+B), according to a control signal CTRL1 in operation S226.

The controller 201 may determine an operation of the calculator 205 according to each sign of the first integer A and the second integer B in operation S228. The controller 201 may generate a control signal CTRL2 and transmit it to the calculator 205 to control the calculator 205 to perform the operation determined in operation S228.

The calculator 205 performs the determined operation on a median C1 and a modulus M according to a received control signal CTRL2 in operation S230. According to the determined operation, a result value C2 output from the calculator 205 is as follows.

$$A<0, B<0 \rightarrow C2=C1+M(-M \le C<M) \quad \quad \quad \quad 5)$$

$$A<0, B \ge 0 \rightarrow C2=C1(-M \le C<M) \quad \quad \quad \quad 6)$$

$$A \ge 0, B<0 \rightarrow C2=C1(-M \le C<M) \quad \quad \quad \quad 7)$$

$$A \ge 0, B \ge 0 \rightarrow C2=C-M(-M \le C<M) \quad \quad \quad \quad 8)$$

The calculator 205 outputs a result value C2 in operation S232. Here, the controller 201 may control an operation of the modular calculator 200 or the calculator 205 so that the result value C2 may be stored in the first register 202 or the second register 203.

According to an exemplary embodiment, the controller 201 may control an operation of the calculator 205 to output a new result value by adding a modulus M to a result value C2 when the result value C2 is less than 0. For example, the controller 201 may control an operation of the calculator 205 so that 14 or 7 may be output as a new result value C2 by adding once more a modulus M, i.e., 17, to −3 or −10 when −3 or −10 is output as a result value C2.

Figure 6:
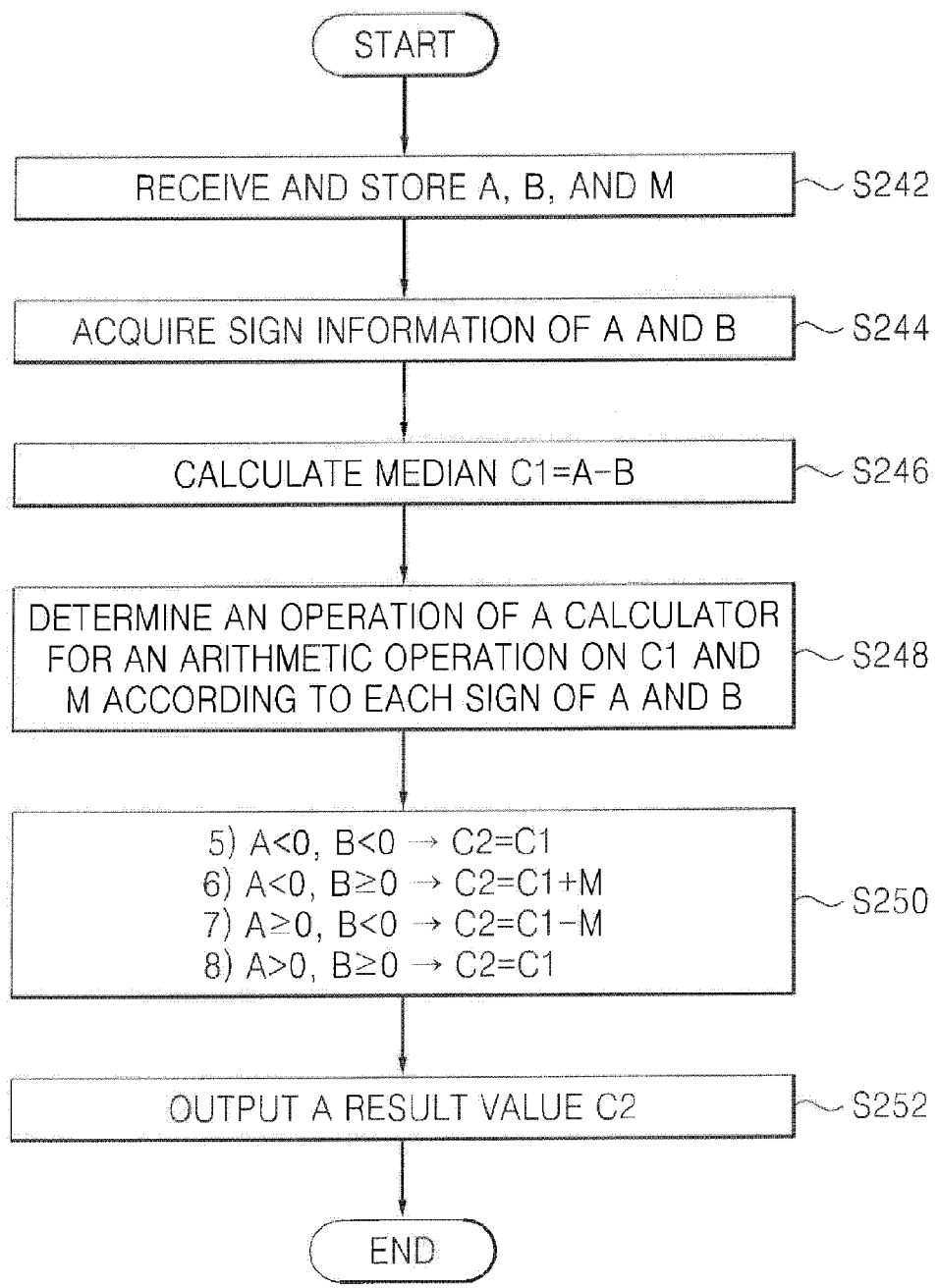
FIG. 6 is a flowchart illustrating another exemplary embodiment of a modular operation method of the modular calculator illustrated in FIG. 4.

FIG. 6 is a flowchart illustrating another example of a modular operation method of the modular calculator 200 illustrated in FIG. 4. FIG. 6 shows a modular operation method on modular subtraction, i.e., (A−B), among modular operation methods.

Referring to FIGS. 4 and 6, the modular calculator 200 stores each integer A and B which is input from outside in each register 202 and 203 in operation S242. The controller 201 acquires sign information SIGN_1 and SIGN_2 of each of the first integer A and the second integer B from the first register 202 and the second register 203 in operation S244. The controller 201 determines a sign of each of the first integer A and the second integer B by referring to acquired sign information SIGN_1 and SIGN_2. Each of the first integer A and the second integer B is greater than or equal to a negative modulus −M and less than a positive modulus M, so that each sign of the first integer A and the second integer B may be determined as follows.

$$-M \le A<0, -M \le B<0 \qquad 1)$$

$$-M \le A<0, 0 \le B<M \qquad 2)$$

$$0 \le A<M, -M \le B<0 \qquad 3)$$

$$0 \le A<M, 0 \le B<M \qquad 4)$$

The controller 201 transmits a control signal CTRL1 to the calculator 205 to control the calculator 205 to calculate a subtraction of the first integer A and the second integer B, i.e., a median (C1=A−B). The calculator 205 calculates a subtraction of the first integer A and the second integer B, i.e., a median (C1=A−B), in operation S246.

The controller 201 determines an operation to be performed by the calculator 205 according to a sign of each of the first integer A and the second integer B in operation S248. The controller 201 may control an operation of the calculator 205 so that the calculator 205 performs the operation determined in operation S248.

The calculator 205 performs an operation on a median C1 and a modulus M in operation S250 according to a control signal CTRL2 output from the controller 201. A result value C2 output by the calculator 205 according to the determined operation is as follows.

$$A<0, B<0 \rightarrow C2=C1(-M<C<M) \qquad 5)$$

$$A<0, B \ge 0 \rightarrow C2=C1+M(-M<C<M) \qquad 6)$$

$$A \ge 0, B<0 \rightarrow C2=C1-M(-M<C<M) \qquad 7)$$

$$A \ge 0, B \ge 0 \rightarrow C2=C1(-M<C<M) \qquad 8)$$

The calculator 205 outputs a result value C2 in operation S252. Here, the controller 201 may control an operation of the calculator 205 so that the result value C2 may be stored in the first register 202 or the second register 203.

According to an exemplary embodiment, the controller 201 may also control an operation of the calculator 205 to output a new result value by adding a modulus M to a result value C2 when the result value C2 is less than 0. As described above, when the result value C2 is −8 or −15, the controller 201 may control an operation of the calculator 205 to output 9 or 2 as a new result value C2 by adding once more a modulus value M, i.e., 17, to −8 or −15.

The modulus calculator 100 or 200 may be embodied in a part of a data processing device. According to an exemplary embodiment, the modular calculator 100 or 200 may be used in Elliptic Curve Cryptography or a Rivest Shamir Adlman (RSA) system using a public key.

Figure 7:
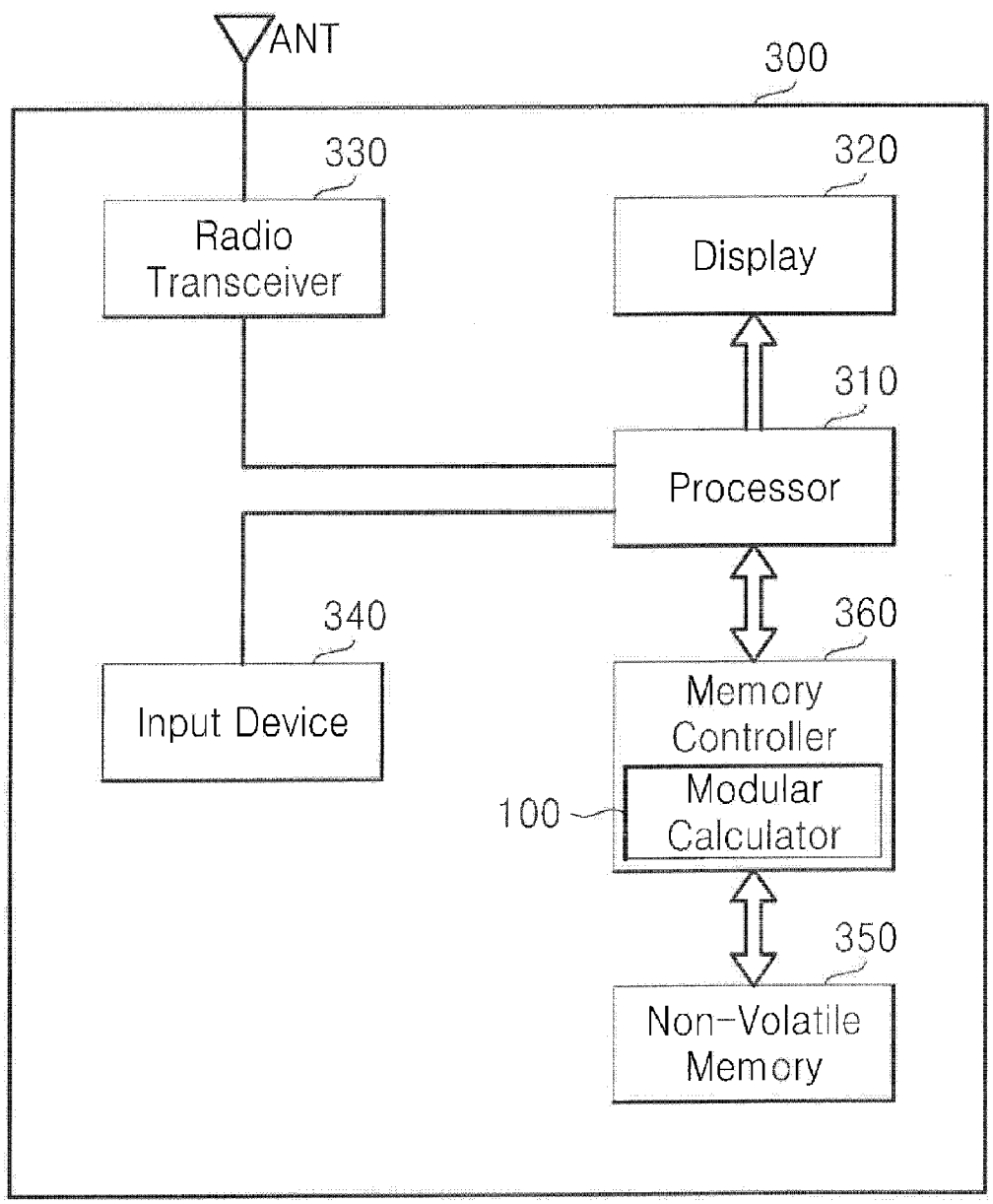
FIG. 7 shows an exemplary embodiment of an electronic device including the modular calculator illustrated in FIG. 1.

FIG. 7 illustrates an exemplary embodiment of an electronic device 300 including the modular calculator 100 illustrated in FIG. 1. Referring to FIG. 7, the electronic device 300 which may be embodied in a cellular phone, a smart phone, a wireless internet device, or the like may include a non-volatile memory 350 and a memory controller 360 which may control an operation of the non-volatile memory 350. Moreover, the memory controller 360 is controlled by a processor 310 which may control a general operation of the electronic device 300. The memory controller 360 may include the modular calculator 100 and perform a modular operation of the present general inventive concept by using data input from the non-volatile memory 350 or an external memory (not shown) under a control of the processor 310.

Data stored in the non-volatile memory 350 may be displayed through a display 320 under a control of the processor 310.

The wireless transceiver 330 may transmit or receive wireless signals through an antenna ANT. The wireless transceiver may receive or transmit ceded data according to an exemplary embodiment. The modular calculator 100 may be used to code data which is not coded or to decode data which is coded.

The wireless transceiver 330 may convert wireless signals received through the antenna ANT into signals that the processor 310 may process. Accordingly, the processor 310 may process signals output from the wireless transceiver 330, store processed signals in the non-volatile memory 350 or display them through the display 320. In addition, the wireless transceiver 330 may convert signals output from the processor 310 into wireless signals and output converted wireless signals to outside through the antenna ANT.

The input device 340 may be embodied in a pointing device such as a touch pad and a computer mouse, a keypad or keyboard as a device which may input control signals to control an operation of the processor 340 or data which are to be processed by the processor 310. The processor 320 may control an operation of the display 320 so that data output from the non-volatile memory device 350, wireless signals output from the wireless transceiver 330 or data output from the input device 340 may be displayed through the display 320.

Additionally, while the electronic device 300 illustrated in FIG. 7 includes the modular calculator 100 illustrated in FIG. 1, the electronic device 300 may alternatively or additionally include the modular calculator 200 illustrated in FIG. 4.

Figure 8:
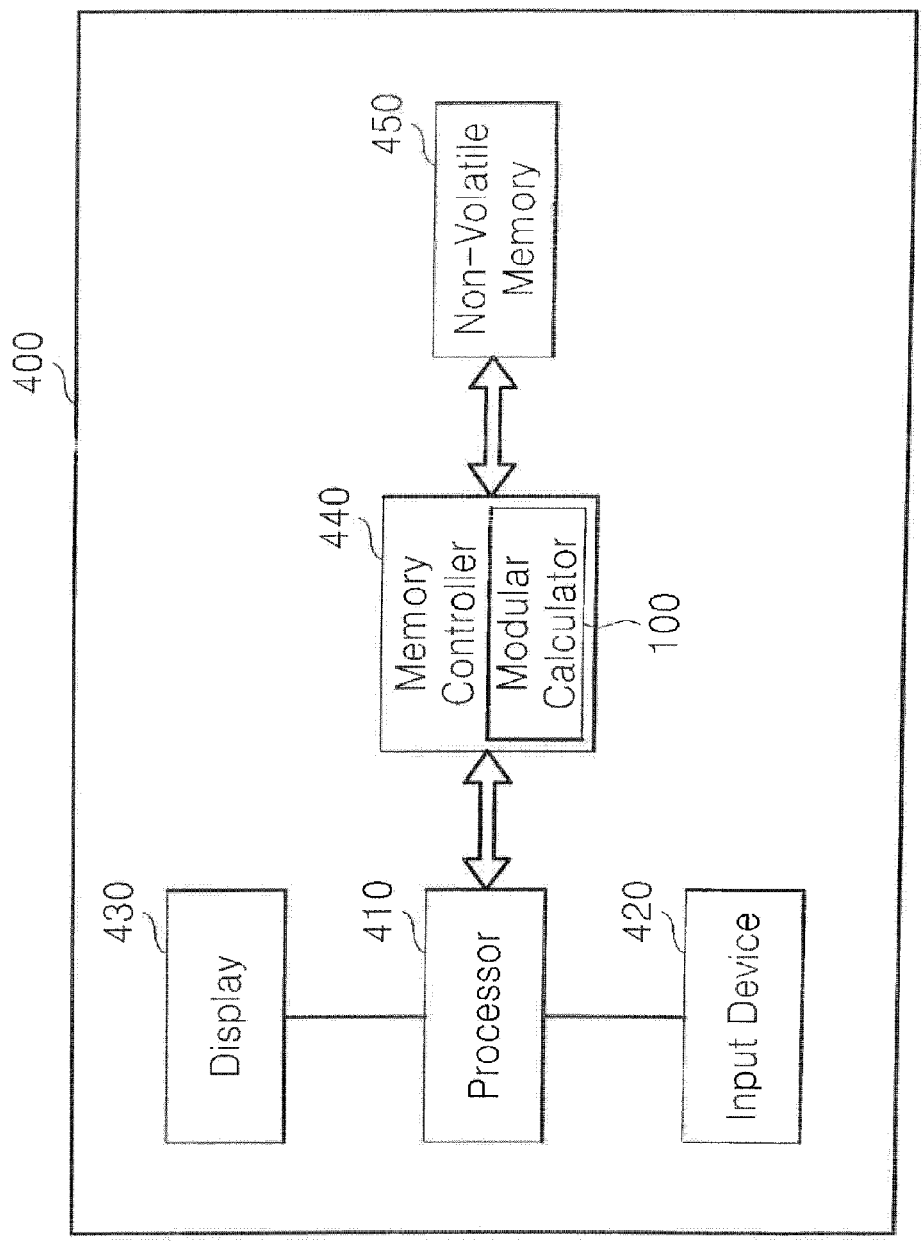
FIG. 8 shows another exemplary embodiment of an electronic device including the modular calculator illustrated in FIG. 1.

FIG. 8 shows another exemplary embodiment of an electronic device 400 including the modular calculator 100 illustrated in FIG. 1. Referring to FIG. 8, the electronic device 400 which may be embodied in a data processing device such as a personal computer (PC), a tablet computer, a net-book, an e-reader, a personal digital assistant (PDA), a portable multimedia player (PMP), an MP3 player, an MP4 player, or the like and includes a non-volatile memory 450 and a memory controller 440 controlling an operation of the non-volatile memory 450.

Additionally, the electronic device 400 may include a processor 410 to control a general operation of the electronic device 400. The memory controller 440 is controlled by the processor 410 which may control a general operation of the electronic device 400. For example, the memory controller 440 may operate the modular controller 100 under a control of the processor 410.

The processor 410 may display data stored in the non-volatile memory 450 through the display 430 according to an input signal generated by the input device 420. For example, the input device 420 may be embodied in a pointing device such as a touch pad, a computer mouse, a keypad, a keyboard, or the like.

Additionally, while the electronic device 400 illustrated in FIG. 8 includes the modular calculator 100 illustrated in FIG. 1, the electronic device 400 may alternatively or additionally include the modular calculator 200 illustrated in FIG. 4.

Figure 9:
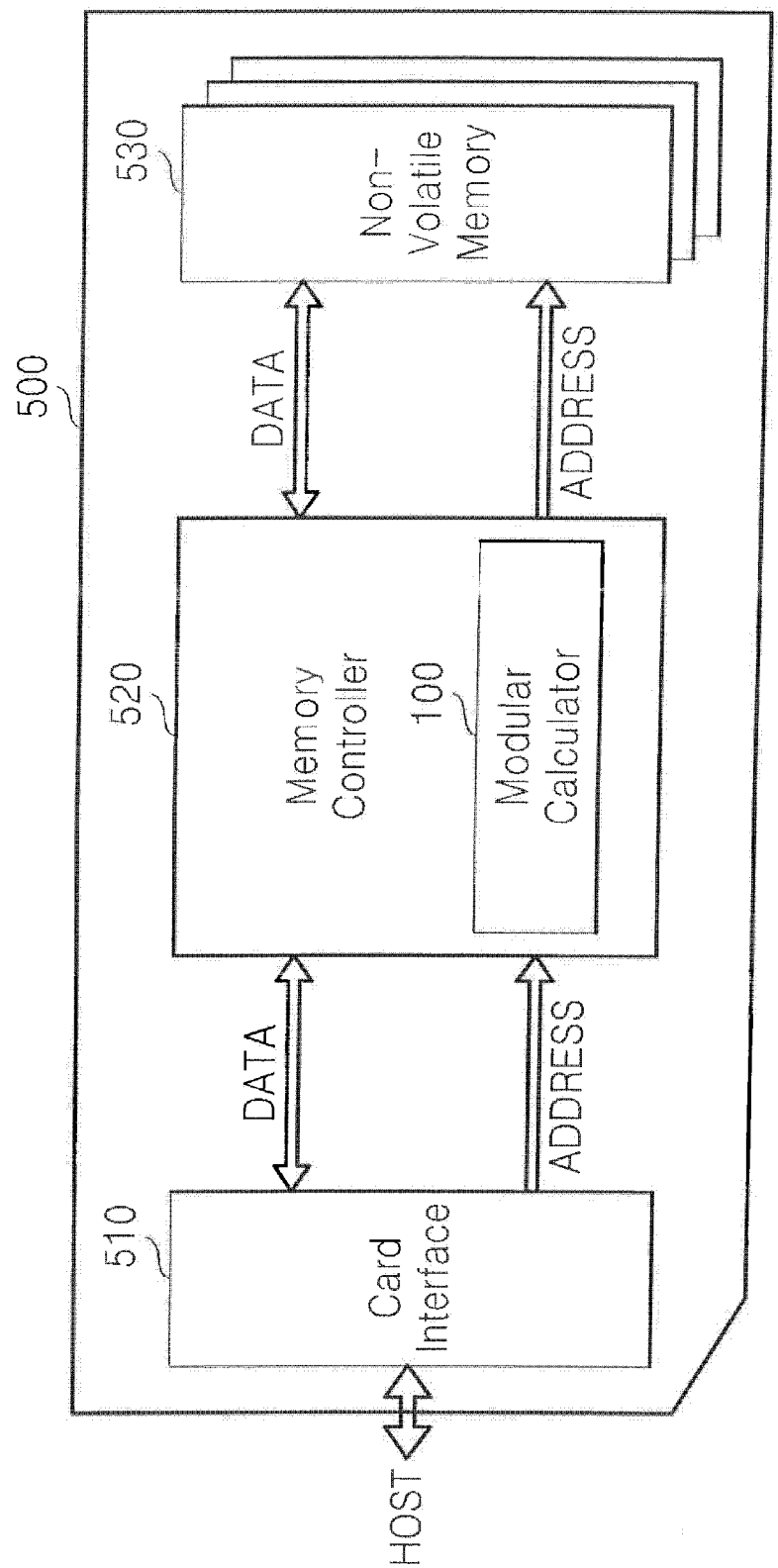
FIG. 9 shows still another exemplary embodiment of an electronic device including the modular calculator illustrated in FIG. 1.

FIG. 9 shows still another exemplary embodiment of an electronic device 500 including the modular calculator 100 illustrated in FIG. 1. Referring to FIG. 9, an electronic device 500 includes a card interface 510, a memory controller 520, and at least one non-volatile memory 530.

An electronic device 500 may transmit or receive data with a host through a card interface 510. According to an exemplary embodiment, the card interface 510 may be a secure digital (SD) care interface or a multi-media card (MMC) interface, however, it is not restricted thereto. The card interface 510 may interface data exchange between a host and a memory controller 520 according to a communication protocol of a host which may communicate with the electronic device 500.

The memory controller 520 may control a data exchange between the card interface 510 and the non-volatile memory 530 by controlling a general operation of the electronic device 500. The memory controller 520 may also include the modular calculator 100 and perform a modular operation to code or decode data received from a host through the card interface 510 or data stored in the non-volatile memory 530.

The memory controller 520 is connected to the card interface 510 and the non-volatile memory 530 through a data bus DATA and an address bus ADDRESS. According to an exemplary embodiment, the memory controller 520 receives address of data to read or to write from the card interface 510 through the address bus ADDRESS and delivers it to the non-volatile memory 530.

In addition, the memory controller 520 receives or transmits data to read or to write through a data bus DATA connected to each of the card interface 510 and the non-volatile memory 530.

In at least one non-volatile memory 530, all sorts of data are stored. According to an exemplary embodiment, a read operation and a write operation may be performed at the same time in the at least one non-volatile memory 530. Here, a memory cell array of the non-volatile memory 530 where a read operation is performed may be different from a memory cell array of the non-volatile memory 530 where a write operation is performed.

When the electronic device 500 of FIG. 9 is connected to a host such as a computer, a digital camera, a digital audio player, a cellular phone, console video game hardware, a digital set-top box, or the like, the host transmits or receives data stored in the at least one non-volatile memory 530 through the card interface 510 and the memory controller 520.

Additionally, while the electronic device 500 illustrated in FIG. 9 includes the modular calculator 100 illustrated in FIG. 1, the electronic device 500 may alternatively or additionally include the modular calculator 200 illustrated in FIG. 4.

Figure 10:
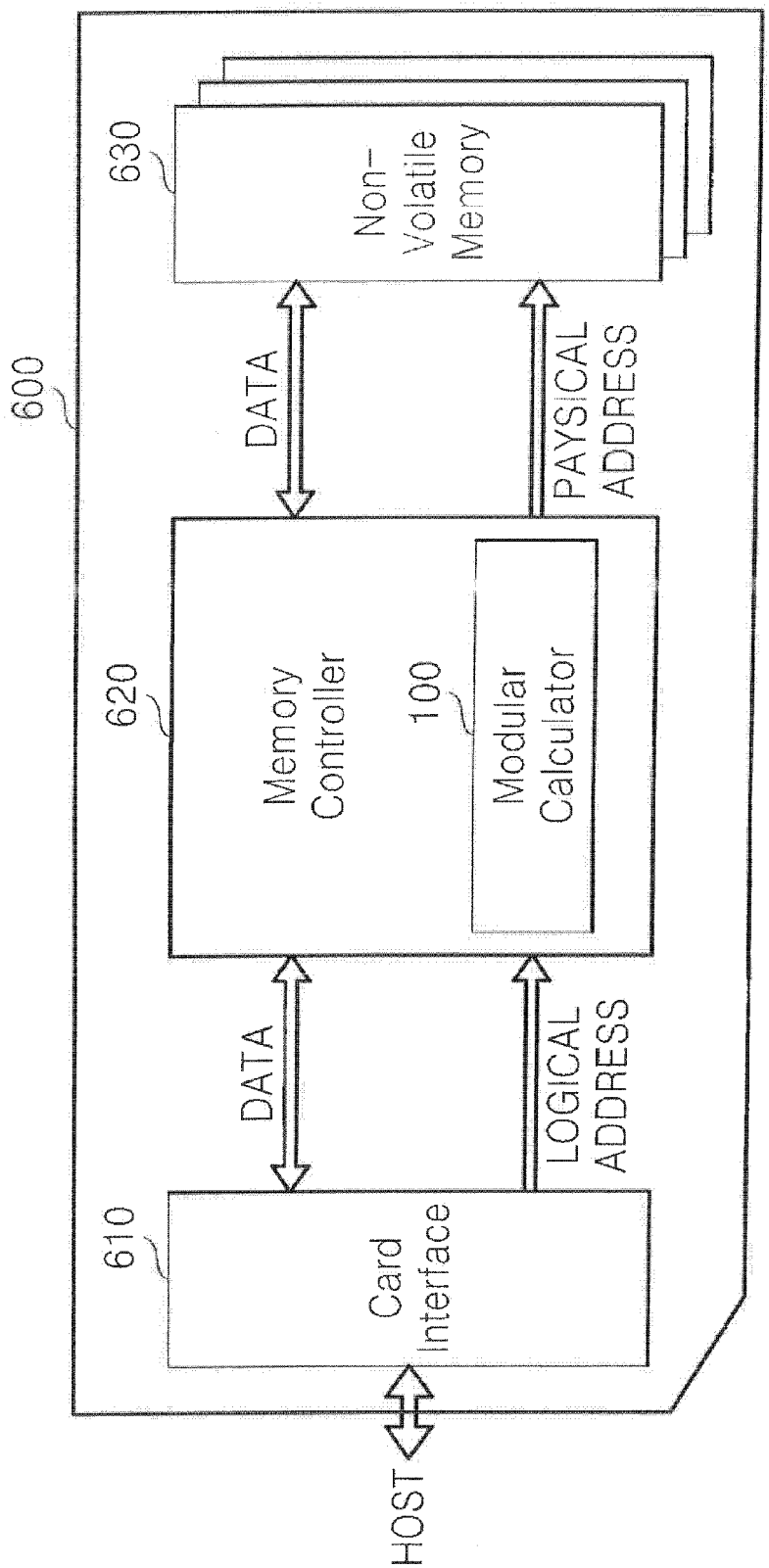
FIG. 10 shows still another exemplary embodiment of an electronic device including the modular calculator illustrated in FIG. 1.

FIG. 10 shows still another exemplary embodiment of an electronic device 600 including the modular calculator 100 illustrated in FIG. 1. Referring to FIG. 10, an electronic device 600 includes a card interface 610, a memory controller 620, and at least one non-volatile memory 630.

The electronic device 600 may perform a data communication with a host through a card interface 610. According to an exemplary embodiment, the card interface 610 may be a secure digital (SD) card interface or a multi-media card (MMC) interface, however, it is not restricted thereto. The card interface 610 may perform a data communication between a host and the memory controller 620 according to a communication protocol of a host which may communicate with the electronic device 600.

The memory controller 620 may control a general operation of the electronic device 600 and control data exchange between the card interface 610 and the at least one non-volatile memory 630.

In addition, the modular calculator 100 included in the memory controller 620 may perform a modular operation to code or decode data received from a host through the card interface 510 or data stored in the non-volatile memory 630.

The memory controller 620 may be connected to the card interface 610 through a data bus DATA and a logical address bus LOGICAL ADDRESS. The memory controller 620 may also be connected to the nonvolatile memory 630 through the data bus DATA and a physical address bus PHYSICAL ADDRESS. According to an exemplary embodiment, the memory controller 620 may receive an address of data to read or to write from the card interface 610 through a logical address bus and deliver it to the nonvolatile memory 630 through a physical address bus PHYSICAL ADDRESS.

The memory controller 620 may also receive or transmit data to read or to write through a data bus DATA connected to each of the card interface 610 and the non-volatile memory 630.

All sorts of data are stored in the at least one non-volatile memory 630. According to an exemplary embodiment, a read operation and a write operation may be performed simultaneously in the at least one non-volatile memory 630. Here, a memory cell of the non-volatile memory 630 where a read operation is performed may be different from a memory cell array of the non-volatile memory 630 where a write operation is performed.

According to an exemplary embodiment, the memory controller 620 of the electronic device 600 may include an address translation table inside a buffer memory (not shown). There may be included a logical address input from outside and a physical address to access the non-volatile memory 630 in the address translation table. During a write operation, the memory controller 620 may write new data in an arbitrary physical address and update the address translation table.

The memory controller 620 may select a physical address to perform a read operation along with a write operation by referring to a physical address of data where a write operation is performed from the address translation table. The memory controller 620 performs the write operation along with the read operation and updates the address translation table according to the write operation and the read operation. Accordingly, an operation time of the electronic device 600 may be reduced.

When the electronic device 600 of FIG. 10 is connected to a host such as a computer, a digital camera, a digital audio player, a cellular phone, console video game hardware, a digital set-top box, or the like, a host may transmit or receive data stored in the at least one non-volatile memory 630 through the card interface 610 and the memory controller 620.

Additionally, while the electronic device 600 illustrated in FIG. 10 includes the modular calculator 100 illustrated in FIG. 1, the electronic device 600 may alternatively or additionally include the modular calculator 200 illustrated in FIG. 4.

Figure 11:
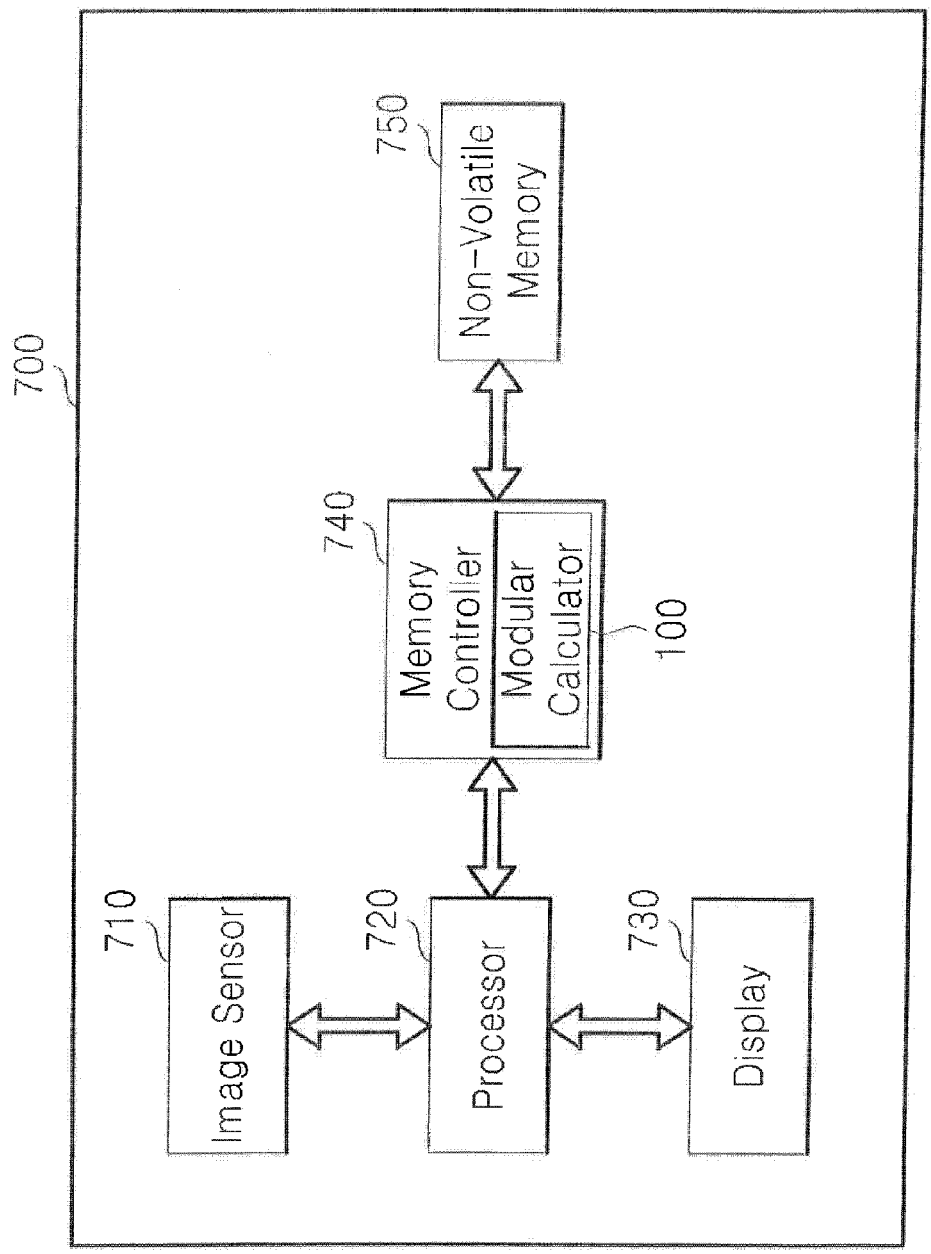
FIG. 11 shows still another exemplary embodiment of an electronic device including the modular calculator illustrated in FIG. 1.

FIG. 11 shows still another exemplary embodiment of an electronic device 700 including the modular calculator 100 illustrated in FIG. 1. Referring to FIG. 11, an electronic device 700 includes a non-volatile memory 750, a memory controller 740 to control a data processing operation of the non-volatile memory 750, and a processor 720 to control a general operation of the electronic device 700. The memory controller 740 may operate the modular calculator 100 of the present general inventive concept under a control of the processor 710.

An image sensor 710 of the electronic device 700 converts an optical image into digital signals and the converted digital signals are stored in the non-volatile memory 750 or displayed through a display 730 under a control of the processor 720.

Additionally, while the electronic device 700 illustrated in FIG. 11 includes the modular calculator 100 illustrated in FIG. 1, the electronic device 700 may alternatively or additionally include the modular calculator 200 illustrated in FIG. 4.

Figure 12:
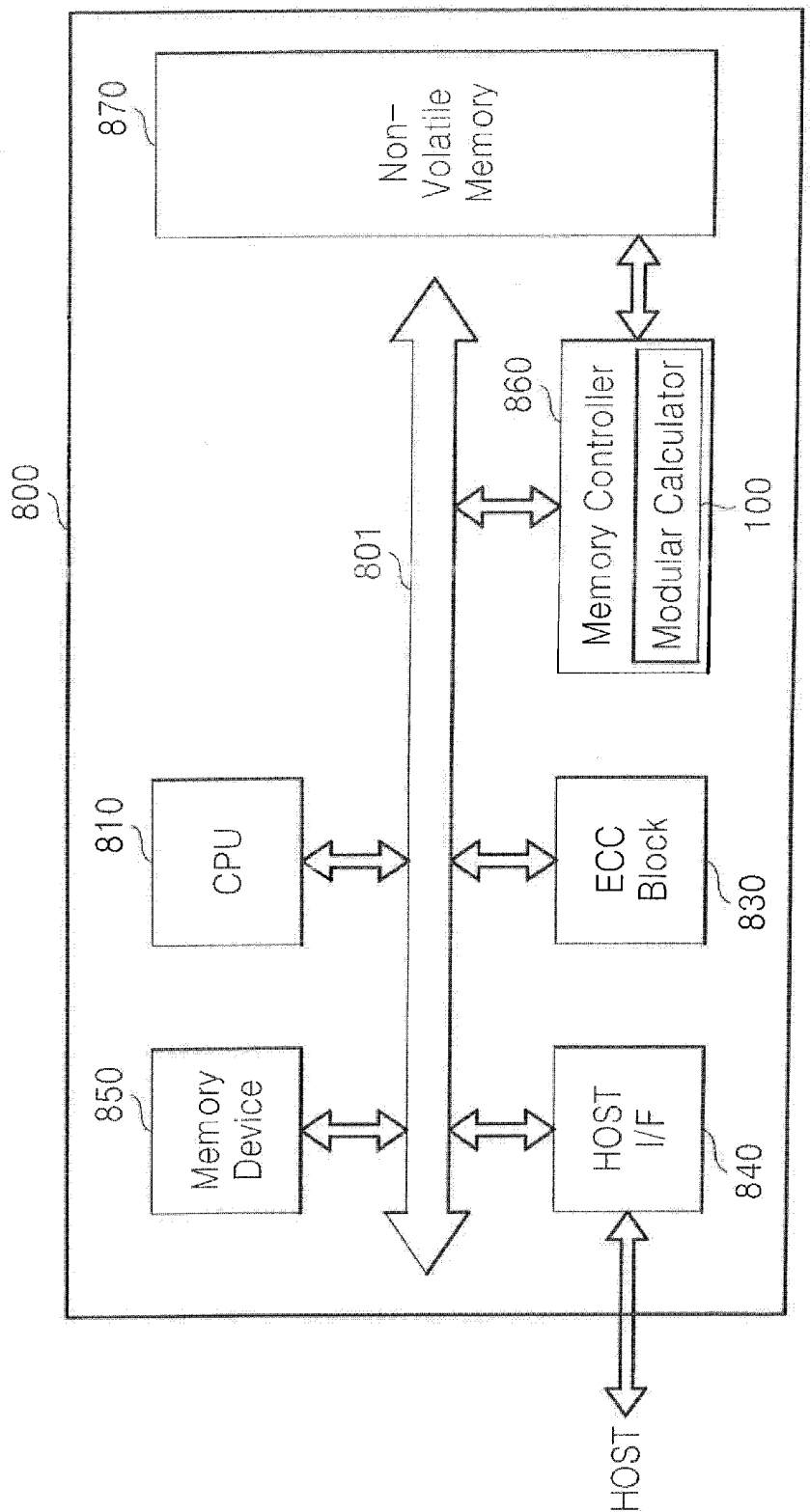
FIG. 12 shows still another exemplary embodiment of an electronic device including the modular calculator illustrated in FIG. 1.

FIG. 12 shows still another exemplary embodiment of an electronic device 800 including the modular calculator 100 illustrated in FIG. 1. Referring to FIG. 12, the electronic device 800 includes a nonvolatile memory 870, a memory controller 860 to control an operation of the non-volatile memory 870 and a central processing unit (CPU) 810 to control a general operation of the electronic device 800.

The electronic device 800 includes a memory device 850 which may be used as an operation memory of the CPU 810. The memory device 850 may be embodied in a non-volatile memory like read only memory (ROM) or a volatile memory like dynamic random access memory (DRAM). A host connected to the electronic device 800 may transmit or receive data to/from the non-volatile memory 870 through the memory controller 860 and a host interface 840. Here, the memory controller 860 may perform a function of a memory interface. The memory controller 860 may operate the modular calculator 100 under a control of the CPU 810.

An error correction code (ECC) block 830 operating according to a control of the CPU 810 may detect and correct an error included in data read from the non-volatile memory device 870 through the memory controller 860.

The CPU 810 may control data exchange among the memory controller 860, an ECC block 830, the host interface 840 and the non-volatile memory 870 through a bus 801. The electronic device 800 may be embodied in a universal serial bus (USB) memory drive, a memory stick, or the like.

Additionally, while the electronic device 800 illustrated in FIG. 12 includes the modular calculator 100 illustrated in FIG. 1, the electronic device 800 may alternatively or additionally include the modular calculator 200 illustrated in FIG. 4.

Figure 13:
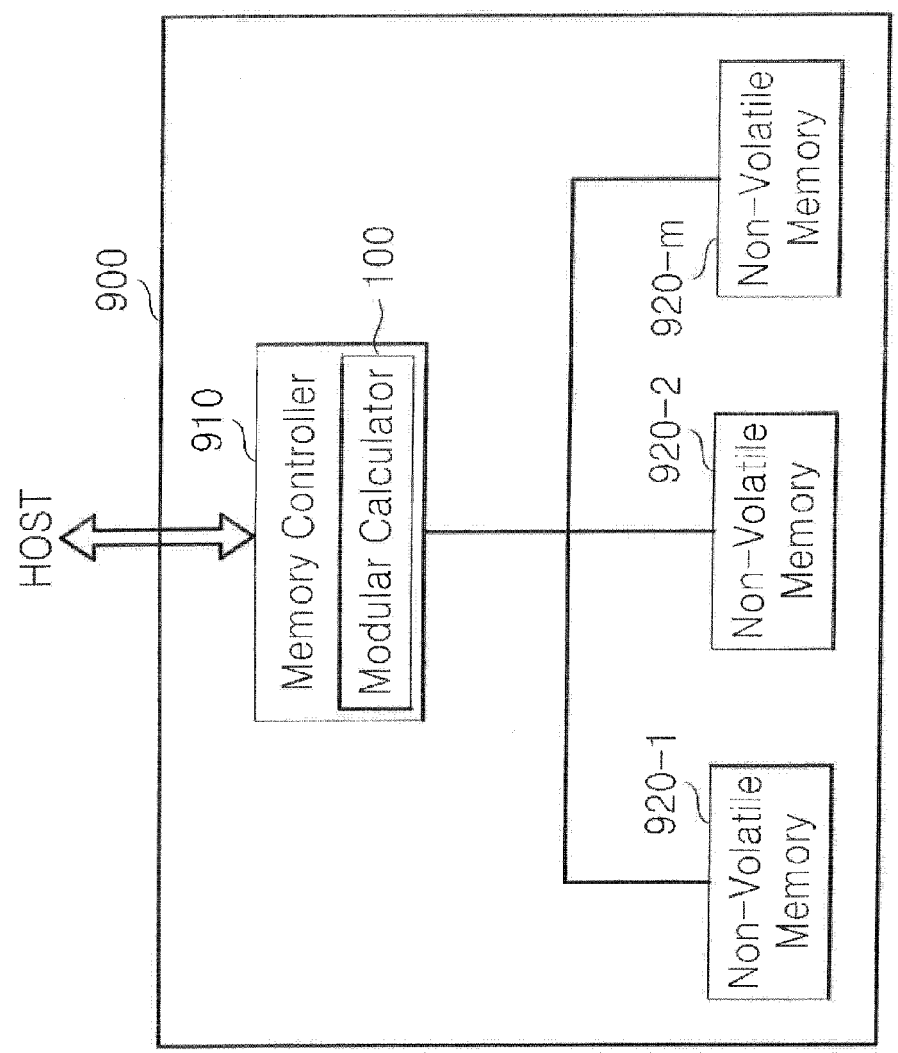
FIG. 13 shows still another exemplary embodiment of an electronic device including the modular calculator illustrated in FIG. 1.

FIG. 13 shows still another exemplary embodiment of an electronic device 900 including the modular calculator 100 illustrated in FIG. 1. Referring to FIG. 13, an electronic device 900 may be embodied in a data storage device like a solid state drive (SSD). The electronic device 900 may include a plurality of non-volatile memories 920-1 to 920-$m$ and a memory controller 910 controlling each data processing operation of the plurality of non-volatile memories 920-1 to 920-$m$. The electronic device 900 may be embodied in a memory system or a memory module. According to an exemplary embodiment, the memory controller 910 may be embodied inside or outside the electronic device 900.

The modular calculator 100 included in the memory controller 910 may perform a modular operation to code or decode data received from a host or data stored in the plurality of non-volatile memories 920-1 to 920-$m$.

Additionally, while the electronic device 900 illustrated in FIG. 13 includes the modular calculator 100 illustrated in FIG. 1, the electronic device 900 may alternatively or additionally include the modular calculator 200 illustrated in FIG. 4.

Figure 14:
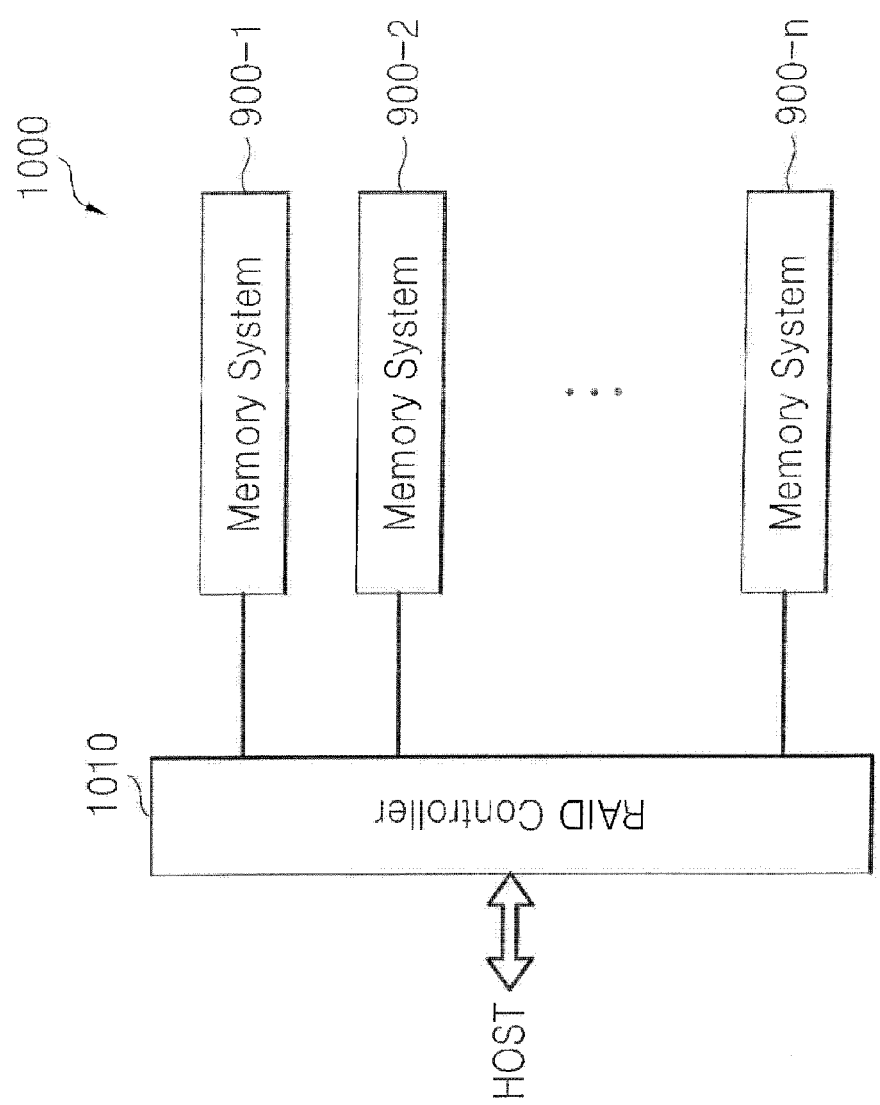
FIG. 14 shows an exemplary embodiment of a data processing device including the electronic device illustrated in FIG. 13.

FIG. 14 shows an exemplary embodiment of a data processing device 1000 including the electronic device 900 illustrated in FIG. 13. Referring to FIGS. 13 and 14, a data storage device 1000 which may be embodied in a redundant array of independent disks (RAID) system may include a RAID controller 1010 and a plurality of memory systems 900-1 to 900-$n$, where n is a natural number.

Each of the plurality of memory systems 900-1 to 900-$n$ may be the electronic device 900 illustrated in FIG. 13. The plurality of memory systems 900-1 to 900-$n$ may form a RAID array. The data storage device 1000 may be embodied in a personal computer (PC) or an SSD. During a program operation, a RAID controller 1010 may output program data output from a host to one of the plurality of memory systems 900-1 to 900-$n$ according to one of a plurality of RAID levels, which is selected based on RAID level information output from the host.

Additionally, during a read operation, the RAID controller 1010 may transmit data read from a memory module among the plurality of memory systems 900-1 to 900-$n$ to the host according to one of a plurality of RAID levels, which is selected based on RAID level information output from the host.

When a modular addition or a modular subtraction is performed, a modular operation method according to an exemplary embodiment of the present general inventive concept and a device performing the method, by using sign information of each of two integers necessary for the modular addition or the modular subtraction, may determine an arithmetic operation on one of addition or subtraction of the two integers and a modulus value.

A modular operation method of the present general inventive concept and a device performing the method, by using only sign information of each of the two integers necessary for the modular addition or the modular subtraction, may determine whether to add or to subtract a modulus value to/from one of addition or subtraction of the two integers or to not modify the addition or subtraction of the two integers, so that it is not necessary to compare one of addition and subtraction of the two integers with a modulus value. Therefore, a modular operation method of the present general inventive concept and a device performing the method may shorten a modulus operation procedure.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A modular calculator comprising:
   a first register to receive and to store a first integer;
   a second register to receive and to store a second integer;
   a calculator connected to an output terminal of the first register and an output terminal of the second register; and
   a controller to determine an arithmetic operation of the calculator by referring to a sign of the first integer and a sign of the second integer and to control the calculator to perform the determined arithmetic operation on one of an addition and a subtraction of the first integer and the second integer and a modulus value.

2. The modular calculator of claim 1, further comprising:
   a third register to store the modulus value.

3. The modular calculator of claim 1, wherein the calculator performs the arithmetic operation on the addition based on the sign of the first integer and the sign of the second integer according to equation 1, $$A<0, B<0 \rightarrow C=A+B+M$$
$$A<0, B\geq 0 \rightarrow C=A+B$$
$$A\geq 0, B<0 \rightarrow C=A+B$$
$$A\geq 0, B\geq 0 \rightarrow C=A+B-M \quad \text{[Equation 1]}$$

wherein A is the first integer, B is the second integer, M is the modulus value, and C is a result value.

4. The modular calculator of claim 3, wherein, when the result value calculated by performing the arithmetic operation is less than 0, the calculator calculates a new result value by adding the modulus value to the result value and outputs the new result value.

5. The modular calculator of claim 1, wherein the calculator performs the arithmetic operation on the subtraction based on the sign of the first integer and the sign of the second integer according to equation 2, $$A<0, B<0 \rightarrow C=A-B$$
$$A<0, B\geq 0 \rightarrow C=A-B+M$$
$$A\geq 0, B<0 \rightarrow C=A-B-M$$
$$A\geq 0, B\geq 0 \rightarrow C=A-B \quad \text{[Equation 2]}$$

wherein A is the first integer, B is the second integer, M is the modulus value, and C is a result value.

6. The modular calculator of claim 5, wherein, when the result value calculated by performing the arithmetic operation is less than 0, the calculator calculates a new result value by adding the modulus value to the result value and outputs the new result value.

7. The modular calculator of claim 1, wherein the modular calculator is included in a memory controller of a non-volatile memory.

8. A memory device comprising:
   a non-volatile memory to store a first integer and a second integer; and
   a memory controller including a modular calculator to perform a modular operation on an addition or a subtraction of the first integer and the second integer,
   wherein the modular calculator comprises:
   a first register to receive and to store the first integer;
   a second register to receive and to store the second integer;
   a calculator connected to an output terminal of the first register and an output terminal of the second register; and
   a controller to determine an arithmetic operation of the calculator by referring to a sign of the first integer and a sign of the second integer and to control the calculator to perform the determined arithmetic operation on one of the addition and the subtraction of the first integer and the second integer and a modulus value.

9. The memory device of claim 8, wherein the calculator performs the arithmetic operation on the addition based on the sign of the first integer and the sign of the second integer according to an equation 3, $$A<0, B<0 \rightarrow C=A+B+M$$
$$A<0, B\geq 0 \rightarrow C=A+B$$
$$A\geq 0, B<0 \rightarrow C=A+B$$
$$A\geq 0, B\geq 0 \rightarrow C=A+B-M \quad \text{[Equation 3]}$$

wherein A is the first integer, B is the second integer, M is the modulus value, and C is a result value.

10. The memory device of claim 9, wherein, when the result value calculated by performing the arithmetic operation is less than 0, the calculator calculates a new result value by adding the modulus value to the result value and outputs the new result value.

11. The memory device of claim 8, wherein the calculator performs the arithmetic operation on the subtraction based on the sign of the first integer and the sign of the second integer according to an equation 4, $$A<0, B<0 \rightarrow C=A-B$$
$$A<0, B\geq 0 \rightarrow C=A-B+M$$
$$A\geq 0, B<0 \rightarrow C=A-B-M$$
$$A\geq 0, B\geq 0 \rightarrow C=A-B \quad \text{[Equation 4]}$$

wherein A is the first integer, B is the second integer, M is the modulus value, and C is a result value.

12. The memory device of claim 11, wherein, when the result value calculated by performing the arithmetic operation is less than 0, the calculator calculates a new result value by adding the modulus value to the result value and outputs the new result value.

13. An electronic device comprising:
    the memory device of claim 8; and
    a processor for controlling an operation of the memory device.

14. The electronic device of claim 13, wherein the modular calculator further comprises:
    a third register to store the modulus value.

15. A memory card comprising:
    a card interface; and
    a memory controller for controlling data exchange transmitted or received to/from the card interface in the memory device of claim 8.

16. A modular calculator comprising:
    a first register to store a first integer;
    a second register to store a second integer and a modulus value, wherein the first integer and the second integer are greater than or equal to a negative of the modulus value and less than the modulus value;

a calculator to calculate a median by performing an addition or a subtraction operation on the first integer and the second integer and to calculate and output a result value; and a controller to control the calculator to perform either the addition or the subtraction operation and to control the calculator to calculate the result value by performing one of adding the modulus value to the calculated median, subtracting the modulus value from the calculated median, and not modifying the calculated median according to a first sign information of the first integer and a second sign information of the second integer.

17. The modular calculator of claim 16, wherein the first register outputs the first sign information of the first integer to the controller and the second register outputs the second sign information of the second integer to the controller.

18. The modular calculator of claim 16, further comprising:
- a first multiplexer to receive the first integer from an external source and the calculated median from the calculator; and
- a second multiplexer to receive the second integer and the modulus value from the external source,
- wherein the controller outputs a first selection signal to the first multiplexer to control the first multiplexer to output either the first integer or the median value to the first register and outputs a second selection signal to the second multiplexer to control the second multiplexer to output either the second integer or the modulus value to the second register.

19. The modular calculator of claim 16, wherein the controller outputs a first control signal to the calculator to control the calculator to perform either the addition or the subtraction operation on the first integer and the second integer and outputs a second control signal to the calculator to control the calculator to perform one of adding the modulus value to the calculated median, subtracting the modulus value from the calculated median, and not modifying the calculated median.

20. The modular calculator of claim 16, wherein when the controller controls the calculator to perform the addition operation, the controller controls the calculator to calculate the result value according to an equation 5, $$A<0, B<0 \rightarrow C2 = C1 + M$$
$$A<0, B \geq 0 \rightarrow C2 = C1$$
$$A \geq 0, B<0 \rightarrow C2 = C1$$
$$A \geq, B \geq \rightarrow C2 = C1 - M \qquad \text{[Equation 5]}$$

wherein A is the first integer, B is the second integer, M is the modulus value, C1 is the calculated median, and C2 is the result value, and when the controller controls the calculator to perform the subtraction operation, the controller controls the calculator to calculate the result value according to an equation 6, $$A<0, B<0 \rightarrow C2 = C1$$
$$A<0, B \geq 0 \rightarrow C2 = C1 + M$$
$$A \geq 0, B<0 \rightarrow C2 = C1 - M$$
$$A \geq, B \geq \rightarrow C2 = C1 \qquad \text{[Equation 6]}$$

wherein A is the first integer, B is the second integer, M is the modulus value, C1 is the calculated median, and C2 is the result value.

* * * * *